(12) United States Patent
Shen et al.

(10) Patent No.: US 11,450,884 B2
(45) Date of Patent: Sep. 20, 2022

(54) ELECTROLYTE, ANODE-FREE RECHARGEABLE BATTERY, METHOD OF FORMING ANODE-FREE RECHARGEABLE BATTERY, BATTERY, AND METHOD OF FORMING BATTERY

(71) Applicant: Factorial Inc., Woburn, MA (US)

(72) Inventors: Luxi Shen, Woburn, MA (US); Peishen Huang, Woburn, MA (US); Dong Ren, Wilmington, MA (US)

(73) Assignee: Factorial Inc., Woburn, MA (US)

(*) Notice: Subject to any disclaimer, the term of this patent is extended or adjusted under 35 U.S.C. 154(b) by 382 days.

(21) Appl. No.: 16/512,397

(22) Filed: Jul. 16, 2019

(65) Prior Publication Data

US 2021/0020986 A1    Jan. 21, 2021

(51) Int. Cl.
| | |
|---|---|
| *H01M 10/0565* | (2010.01) |
| *H01M 4/505* | (2010.01) |
| *H01M 4/525* | (2010.01) |
| *H01M 10/0525* | (2010.01) |
| *C08L 33/14* | (2006.01) |
| *C08L 33/26* | (2006.01) |
| *C08L 63/00* | (2006.01) |

(52) U.S. Cl.
CPC ......... *H01M 10/0565* (2013.01); *C08L 33/14* (2013.01); *C08L 33/26* (2013.01); *C08L 63/00* (2013.01); *H01M 4/505* (2013.01); *H01M 4/525* (2013.01); *H01M 10/0525* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS

| | | | |
|---|---|---|---|
| 5,691,080 | A | 11/1997 | Derson et al. |
| 6,822,065 | B1 | 11/2004 | Sanchez et al. |
| 2003/0059681 | A1 | 3/2003 | Noh |
| 2016/0336619 | A1 | 11/2016 | Choi et al. |
| 2016/0372743 | A1* | 12/2016 | Cho ................... H01M 4/62 |
| 2018/0316051 | A1* | 11/2018 | Lee .................... H01M 4/405 |
| 2020/0144665 | A1 | 5/2020 | Huang et al. |
| 2020/0144667 | A1 | 5/2020 | Huang et al. |
| 2021/0151794 | A9 | 5/2021 | Huang et al. |
| 2021/0151795 | A9 | 5/2021 | Huang et al. |

OTHER PUBLICATIONS

Osada et al. Ionic-Liquid-Based Polymer Electrolytes for Battery Applications Irene Osada, Henrik de Vries, Bruno Scrosati,* and Stefano Passerini* Angew. Chem. Int. Ed. 2016, 55, 500-513 (Year: 2016).*

Qian et al. Anode-Free Rechargeable Lithium Metal Batteries, Adv. Funct. Mater. 2016, 26, 7094-7102 (Year: 2016).*

(Continued)

*Primary Examiner* — Lucas J. O'Donnell
(74) *Attorney, Agent, or Firm* — JCIP Global Inc.

(57) ABSTRACT

An electrolyte includes an ionic liquid and an electrolyte salt dispersed in the ionic liquid. The ionic liquid includes organic nitrogen cations and charge-delocalized organic anions. The electrolyte salt is selected from alkali metal salt and/or alkaline earth metal salt.

17 Claims, 4 Drawing Sheets

(56) References Cited

OTHER PUBLICATIONS

Forsyth et al.; Innovative Electrolytes Based on Ionic Liquids and Polymers for Next-Generation Solid-State Batteries; Acc. Chem. Res. 2019, 52, 686-694 (Year: 2019).*
European patent search report for EP19205029 (Year: 2020).*
Written Opinion of the International Searching Authority for PCT/US2019/012310 (Year: 2019).*
Pyr13FSI Chemical Structure from National Library of Medicine PubChem https://pubchem.ncbi.nlm.nih.gov/compound/25171607 (Year: 2021).*
Gupta et al, Solid State Ionics 320 (2018) 186-192, Electrochemical study of Ionic Liquid based polymer electrolyte with graphene oxide coated LiFePO4 cathode for Li battery. (Year: 2018).*
Fu et al., Effects of molecular complexation on phase equilibria in mixtures of urea/polyethylene glycol derivatives and electrochemical performance of urethane based polymer electrolyte membranes for solid-state lithium ion battery; vol. 159, Dec. 20, 2018, pp. 64-74. (Year: 2018).*
Costa et al., Recent advances on separator membranes for lithium-ion battery applications: From porous membranes to solid electrolytes. Energy Storage Materials. 2019.
Alvarado et al., A carbonate-free, sulfone-based electrolyte for high-voltage Li-ion batteries. Mat. Today, May 2018: 21(4): 341-353.
Cai et al., Improving High-Voltage Performance of Lithium-Ion Batteries with Sulfolane as an electrolyte Additive. J. Electrochem, Soc. Feb. 2017: 164(4): A714-720.
Chawla. et al, Recent Advances in Non-Flammable Electrolytes for Safer Lithium-Ion Batteries. Batteries Feb. 2019: 5(19): 25 pages.
Haregewoin et al., Electrolyte additives for lithium ion battery electrodes: progress and perspectives. Energy Environ. Sci. 2016:9:1955-1988.
Vancaeyzeele et al., Lithium-based oligomer ionic liquid for solvent-free conducting materials.. Polymer Apr. 2018. 142:337-347.
Xia et al., Sulfolane-Based Electrolyte for High Voltage Li(Ni0.42Mn0.42Co0.16)02 (NMC442)/Graphite Pouch Cells. J. Electrochem. Soc. 2015:162(8):A1424-1431.
Zeng et al., Non-flammable electrolytes with high salt-to-solvent ratios for Li-ion and Li-metal batteries.Nat. Energy, Jul. 2018: 4: 674-681.

* cited by examiner

ELECTROLYTE, ANODE-FREE RECHARGEABLE BATTERY, METHOD OF FORMING ANODE-FREE RECHARGEABLE BATTERY, BATTERY, AND METHOD OF FORMING BATTERY

FIELD

The present disclosure generally relates to various electrolytes based on ionic liquids for electrochemical devices such as batteries, capacitors, sensors, condensers, electrochromic elements, photoelectric conversion elements, etc.

BACKGROUND

Since the commercialization of lithium batteries, the dominant electrolytes were based on organic carbonates. Despite the considerable advantages, the organic carbonates based electrolytes have severe problems, particularly from the safety perspective. Safety issues existing in lithium batteries may arise from the use of mixed flammable solvents such as carbonate/ether as solvent systems, which, in the case of overcharging, short-circuiting, over-heating, etc. can lead to serious accidents from lithium batteries catching on fire, burning or even exploding, etc.

SUMMARY

The present disclosure generally relates to various electrolytes based on ionic liquids. The present disclosure involves, in some cases, interrelated products, alternative solutions to a particular problem, and/or a plurality of different uses of one or more systems and/or articles.

In one aspect, the present disclosure is generally directed to various electrolytes based on ionic liquids (ILs). The electrolyte includes an ionic liquid and an electrolyte salt dispersed in the ionic liquid. The ionic liquid includes organic nitrogen cations and charge-delocalized organic anions. The electrolyte salt is selected from alkali metal salt and/or alkaline earth metal salt.

In another aspect, the present disclosure is generally directed to a method of making electrolytes based on ionic liquids. In one set of embodiments, the method includes mixing a polymer with a solvent to form a slurry, removing the solvent, and curing the slurry to form a solid electrolyte.

In another aspect, the present disclosure is generally directed to an anode-free rechargeable battery. The anode-free rechargeable battery includes a current collector, a cathode with an electroactive material, and an electrolyte mentioned above.

In another aspect, the present disclosure is generally directed to a battery. The battery includes the electrolyte mentioned above, an anode, and a cathode with an electroactive material.

In another aspect, the present disclosure encompasses methods of making one or more of the embodiments described herein, for example, electrolytes based on ionic liquids.

In another aspect, the present disclosure encompasses methods of making an anode-free rechargeable battery. The method includes at least the following steps. A pre-assembled cell with an anode current collector and a cathode is formed. A mixture of liquid electrolyte and monomer or polymer in a liquid phase of the electrolyte is introduced into the pre-assembled cell. Then, a thermal gelation process is performed to form the anode-free rechargeable battery.

In another aspect, the present disclosure encompasses methods of making a battery. The method includes at least the following steps. A mixture of liquid electrolyte and monomer or polymer in a liquid phase is introduced into a pre-assembled cell without electrolyte. Then, a thermal gelation process is performed to form the battery.

Other advantages and novel features of the present disclosure will become apparent from the following detailed description of various non-limiting embodiments of the disclosure when considered in conjunction with the accompanying figures.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure.

DETAILED DESCRIPTION

Figure 1:
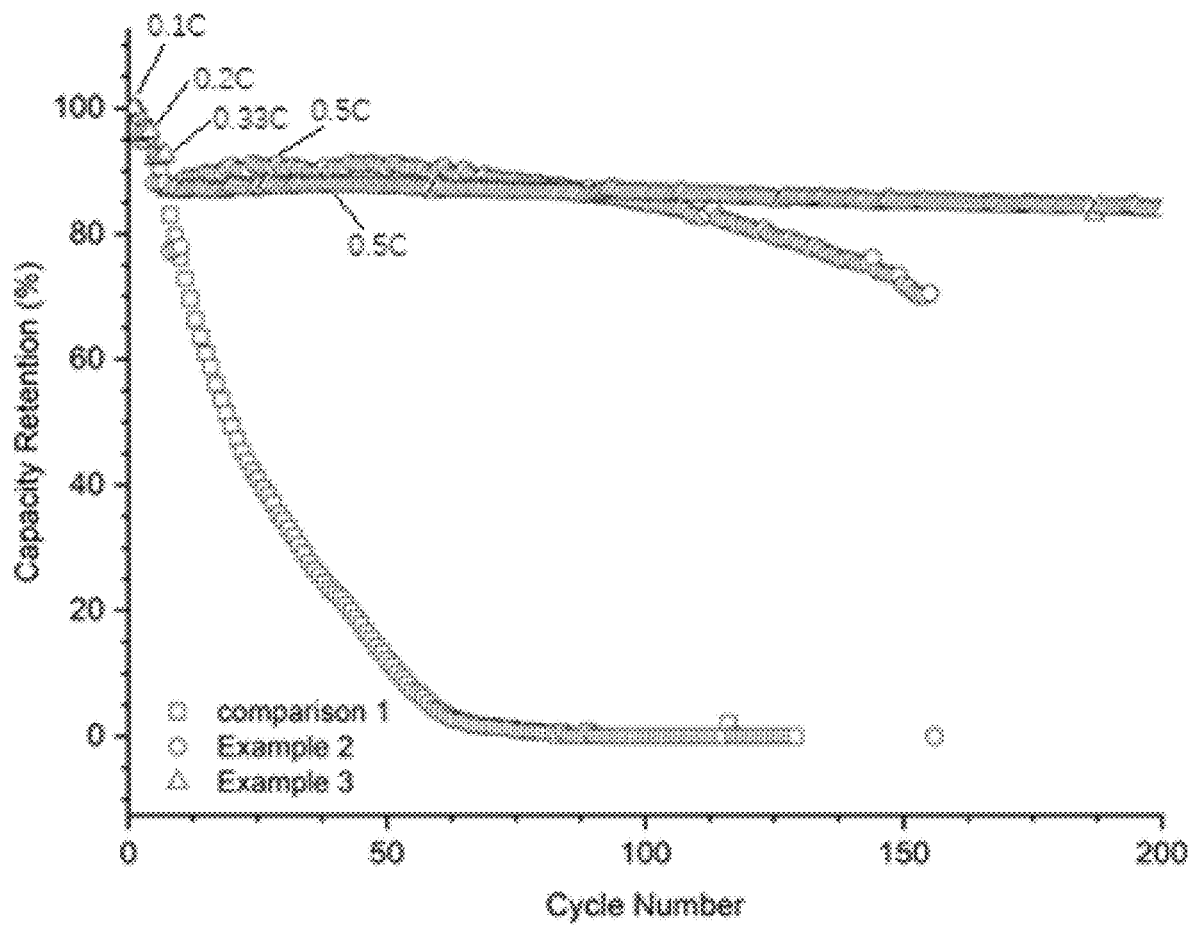
FIG. 1 illustrates cycling performance curves of electrolytes of certain embodiments of the disclosure and the comparative example.

The present disclosure generally relates to various electrolytes based on ionic liquids suitable for various electrochemical devices. Certain aspects include an ionic liquid with cations and charge-delocalized anions, and an electrolyte salt dispersed in the ionic liquid, the electrolyte salt is selected from alkali metal salt and/or alkaline earth metal salt. In certain embodiments, some electrolytes may be used to achieve safer, longer-life lithium batteries. The electrolytes may exhibit better ionic conductivity, and lithium ions may be conducted faster and/or more efficiently. These properties may benefit charging/discharging rate performances for both lithium metal batteries (LMBs) and lithium-ion batteries (LIBs).

In some cases, the incorporation of ionic liquid having low melting point, high ionic conductivity, solubility with many compounds, negligible volatility, flame retardancy, moderate viscosity, high polarity, etc. into the electrolytes can be used to improve the safety of the electrolytes. The introduction of the ionic liquid can prevent fire and explosion caused by the excessive rise of temperature in the battery, so as to improve the safety of the battery.

Ionic liquids are basically composed of organic ions (cations and anions) that may undergo almost unlimited structural variations because of the easy preparation of a large variety of their components. The battery performance is generally affected by the cation. The reason may be that the cations have more significant influence on the viscosity of the electrolytes. The cations of the ionic liquid may be, for example, organic nitrogen cation. Non-limiting examples of suitable cations of the ionic liquid include 1-ethyl-3-methylimidazolium (Im12$^+$), (N,N-diethyl-N-methyl-N (2methyoxyethyl)ammonium, 1,3 -dimethylimidazolium, 1-(4-sulfobutyl)-3-methylimidazolium, 1-butyl-1-methylpyrrolidinium, 1-butyl-3-methylimidazolium, 1-hexyl-3-methylimidazolium, 1-methyl-1 -(2-methoxyethyl)pyrrolidinium, 1-methyl-1-octylpyrrolidinium, 3-methyl-1-propylimidazolium, N,N-diethyl-N-methyl-N-propylammonium, N-butyl-N-methylpiperidinium, N-propyl-N-methylpiperidinium, 1-ethyl-3-methylimidazolium (EMI), 1-Butyl-3-methylimidazolium (BMI), 1-Octyl-3-methylimidazolium (C8MI), 1-decyl-3-methylimidazolium (C10MI), 1-methyl-3-[2,6-(S)-dimethylocten-2-yl] imidazolium (MDI), 1,2-dimethyl-3-ethylimidazolium (M1, 2E3I), 1,2-dimethyl-3-propylimidazolium (DMPI), N-methyl-N-propyl-pyrrolidinium (P13), N-methyl-N-butyl-pyrrolidinium (P14), imidazolium, pyrrolidinium, quaternary ammonium, alicyclic cation, pyrrolidine cation, iminazole cation, ethylmethylimidazolium cation, and quaternary ammonium cation.

Anions of ILs are of vital importance in lithium battery application. Although cathodic instability of ILs at negative potentials is due to cation reduction, it is the anion which plays a substantial role in the electrochemical stability and consequently wideness of the potential window. Non-limiting examples of suitable anions of the ionic liquid include $Cl^-$, bis(fluorosulfonyl)imide ($FSI^-$), $BF_4^-$, difluoro(oxalato)borate ($DFOB^-$), N, N-bis(trifluoromethane)sulphonamide ($TFSI^-$), Bisperfluoroethylsulfonyl imide (BETI), bis(methanesulfonyl)imide (MSI), trifluoromethanesulfonate (OTO, Trifluoroacetate (TA), Hexafluorophosphate (($PF_6^-$)$_3$), $CF_3SO_3^-$, $[(CF_3SO_2)_2N]^-$, $[(FSO_2)_2N]^-$, $[(CF_3SO_2)_2N]^-$, bis(trifluoromethanesulfonyl)imide ($TFSI^-$), iodied, methyl-phosphate, trifluoromethanesulfonate, bis(oxalate)borate ($BOB^-$), acetate, dicyanamide, diethyl phosphate, and hexafluorophosphate. In some cases, the anion includes organic anions. In some cases, the anion includes a 'plasticizing anion,' which is an anion having a delocalized charge and multiple conformations differing only marginally in energy.

Thus, various kinds of ionic liquids can be used in the ionic liquid electrolyte. The ionic liquid has a melting point of, for example, less than 100° C. Non-limiting examples of suitable ionic liquid include N-methyl-N-propylpyrrolidinium bis(fluorosulfonyl)imide ionic liquid, N-alkyl-N-methylpyrrolidinium, perfluorosulfonylimide (PFSI), N-alkyl-N-methylpyrrolidinium (PYR1A) perfluorosulfonylimide (PFSI), 1-ethyl-3-methylimidazolium bis(fluorosulfonyl)imide (IM12FSI), 1-Propyl-3-methylimidazolium Bis(fluorosulfonyl)imide (IM13FSI), N-butyl-N-methyl-pyrrolidinium bis(trifluoromethanesulfonyl)imide (Py14TFSI), N-methyl-N-propyl-pyrrolidinium bis(fluorosulfonyl)imide (Py13FSI), and N-Butyl-N-methylpyrrolidinium bis(fluorosulfonyl)imide (Py14FSI).

In some embodiments, the molecular structures of IM12FSI and Py13FSI are presented below:

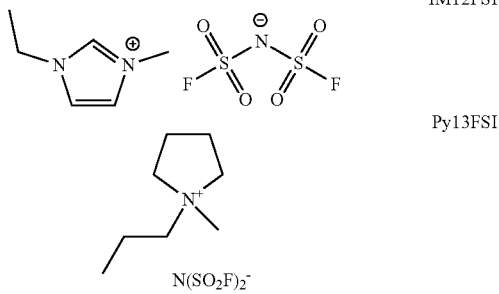

The formation of a solid electrolyte interphase (SEI) is the result of the electrochemical reaction of both anions and cations at the electrode surface. Thus, the nature of a SEI is directly related to the interfacial charge transfer at the electrode surface resulting in the film growth. The ILs in this disclosure are capable of forming a stable and electrochemically active SEI. When suitable electrode material is being used, the battery shows better cyclability in ILs rather than conventional electrolytes.

In some cases, the ionic liquid is present in a gelled or otherwise semi-solid form, while still maintaining its ion conduction properties.

ILs with higher viscosities may deliver better battery performance in term of specific capacity. At the electrode/electrolyte interface, lone Li-ions should be released from the solvation trap. Depending on the IL anions, breaking the solvation trap can be easier for Li ions, leading to a better battery performance.

In this case, lithium coordination in a specific IL plays a substantial role in the battery performance. Coordinations of lithium in protic and aprotic ILs are significantly different. In general, lithium coordination number is lower in protic ILs. This adds an advantage for protic ILs, as it has been claimed that protic ILs can deliver all natural benefits of aprotic ILs for lithium batteries. In general, aprotic ILs provide more stable and wider electrochemical window.

In addition, in some cases, an additive may also be present, such as organic carbonates additives. The interfacial resistance of both anode and cathode decreases by adding an organic carbonate to the IL electrolyte. Along with a less-resistive SEI, organic carbonates can significantly enhance the wettability of electrodes in the corresponding electrolytes, thereby directly improving the battery performance to achieve higher capacities in comparison with pure IL electrolyte without organic carbonates additives. Organic carbonates have excellent stability at negative potentials, and the presence of organic carbonates is able to extend the electrochemical stability of ILs towards negative potentials. In some embodiments, the additive has a volume percentage between 5% and 15% based on the total volume of the electrolyte. A small amount of organic carbonates (e.g., 5%) can significantly improve the battery performance of ILs because the presence of organic additives increases the ionic mobility by lowering the lithium coordination, while the electrolyte is still non-flammable since the content of IL is high enough in this mixture. Non-limiting examples of the organic carbonates additives include ethylene carbonate (EC), vinylene carbonate (VC), fluoroethylene carbonate (FEC), methylene-ethylene carbonate (MEC), 1,2-dimethoxyethane carbonates (DME), diethylene carbonate (DEC), propylene carbonate, dimethyl carbonate, ethyl methyl carbonate, diethyl carbonate, vinylene carbonate, fluoroethylene carbonate, vinyl ethylene carbonate, and a mixture thereof. In some alternative embodiments, non-limiting examples of the additives include sulfolane (SL), N-methylacetamide (NMA), LiBOB, LiDFOB, Py13TFSI, Li[($FSO_2$) (n-$C_4F_9SO_2$) N], 1,4-dioxane, bromide ionomers, methyl viologen, poly(ethyl α-cyanoacrylate), $AlCl_3$, $H_2O$, diglyme, triglyme, tetraglyme, diethyl ether, 1,3-dioxolane, 1,4-dioxane, tetrahydrofuran, 2,5-dimethyltetrahydrofuran, diglyme, triglyme, tetraglyme, diethyl ether, 1,3-dioxolane, 1,4-dioxane, tetrahydrofuran, 2,5-dimethyltetrahydrofuran, trimethyl phosphate, triethyl phosphate, triphenyl phosphate, tris(2,2,2-trifluoroethyl)phosphate, tris(2,2,2-trifluoroethyl)phosphite, dimethyl sulfone, ethyl methyl sulfone, sulfoxide, acetonitrile, propionitrile, butyronitrile, diphenyl sulfone, methyl phenyl sulfone, isopropyl sulfone, trimethylene sulfone, ethyl methyl sulfone, methyl difluoroacetate, fluorine-containing flame retardant (such as difluoroethyl acetate), triethyl phosphate, trimethyl phosphate, hexafluoroisopropyl triphosphate, triisopropyl ethylsulfonyl (pentafluorophenyl) phosphine, hydrofluoroether, 1,1,2,2-tetrafluoroethyl 2,2,3,3-tetrafluoropropyl ether, bis(2,2,2-trifluoroethyl) ether, oligo ethylene glycol methyl ether, tetraethylene glycol dimethyl ether, bis(2,2,2-trifluoroethyl) ether, oligo ethylene glycol methyl ether, oligoethylene glycol, 1,2-dimethoxyethane carbonates, fluoro, methylene-ethylene carbonate, prop-1-ene-1,3-sultone, succinic anhydride, and a mixture thereof. The introduction of sacrificial electrolyte additives, such as vinylene carbonate (VC) and fluoroethylene carbonate (FEC), is able to produce SEIs with desirable chemical composition and physical properties by preferentially break down and undergo polymerization and ion-exchange reactions at the anode/electrolyte interface.

In some cases, the additives such as those described herein can be present at a weight percentage of at least 1 wt %, at least 2 wt %, at least 3 wt %, at least 4 wt %, at least 5 wt %, at least 6 wt %, at least 7 wt %, at least 8 wt %, at least 9 wt %, at least 10 wt %, at least 11 wt %, at least 12 wt %, at least 13 wt %, at least 14 wt %, at least 15 wt %, at least 16 wt %, at least 17 wt %, at least 18 wt %, at least 19 wt %, at least 20 wt %, and/or no more than 20 wt %, no more than 19 wt %, no more than 18 wt %, no more than 17 wt %, no more than 16 wt %, no more than 15 wt %, no more than 14 wt %, no more than 13 wt %, no more than 12 wt %, no more than 11 wt %, no more than 10 wt %, no more than 9 wt %, no more than 8 wt %, no more than 7 wt %, no more than 6 wt %, no more than 5 wt %, no more than 4 wt %, no more than 3 wt %, no more than 2 wt %, no more than 1 wt %, etc. It should be noted that the concentrations of the additives listed above are based on a total weight of the electrolyte.

In some embodiments, an electrolyte salt may be present. In some embodiments, the ionic liquid and the electrolyte salt have the same anion. In some embodiments, the electrolyte salt may be ionic liquid-based electrolyte salt. The electrolyte salt may include alkali metal salts, such as lithium (Li) salts, sodium (Na) salts, potassium (K) salts, calcium (Ca) salts, or magnesium (Mg) salts. Specific non-limiting examples of the lithium salts include lithium perchlorate ($LiClO_4$), lithium hexafluorophosphate ($LiPF_6$), lithiumborofluoride ($LiBF_4$), lithium hexafluoroarsenide ($LiAsF_6$), lithium trifluoro-metasulfonate ($LiCF_3SO_3$), bis-trifluorom-ethyl sulfonylimide lithium ($LiN(CF_3SO_2)_2$), lithium bis(oxalato)borate (LiBOB), lithium oxalyldifluoroborate ($LiBF_2C_2O_4$), lithium nitrate($LiNO_3$), Li-fluoroalkyl-phosphates ($LiPF_3(CF_2CF_3)_3$), lithium bisperfluoroethysulfo-nylimide (LiBETI), lithium bis (trifluoromethanesulphonyl) imide, lithium bis (fuorosulphonyl)imide, lithium trifluoromethanesulfonimide (LiTFSI), lithium bis(fluorosulfonyl)imide (LiFSI), lithium difluoro(oxalato)borate (LiDFOB), lithium perchlorate ($LiClO_4$), $LiC(CF_3SO_2)_3$, LiF, LiCl, LiBr, LiI, $Li_2SO_4$, $LiNO_3$, $Li_3PO_4$, $Li_2CO_3$, LiOH, lithium acetate, lithium trifluoromethyl acetate, lithium oxalate, or a combination thereof.

In some cases, the lithium salts such as those described herein can be present at a concentration of at least 0.1M, at least 0.5M, at least 1 M, at least 2 M, at least 3 M, at least 4 M, at least 5 M, at least 6 M, at least 7 M, and/or no more than 8M, no more than 7 M, no more than 6 M, no more than 5 M, no more than 4 M, no more than 3 M, no more than 2 M, no more than 1 M, etc. Salt concentration is an effective strategy to obtain several unique functionalities of ionic liquid electrolytes, such as wide electrochemical stability windows. For example, electrolytes based on concentrated LiFSI in organic phosphates exhibited unusual capability in enabling reversible cycling of Li+ ions in carbonaceous electrodes. The enhanced solvation in high-concentration electrolytes (HCEs) (e.g., >3 M) can effectively stabilize the solvent molecules and facilitates the formation of a salt-derived SEI that may mitigate anode and electrolyte degradation during extended cycling. For example, concentrated lithium bis(fluorosulfonyl) imide (LiFSI) in the electrolyte showed remarkable stability against reduction by Li and enabled dendrite-free and extremely stable cycling of LMAs. This electrolyte can enable remarkable stability with high voltage cathode and is thus safe for large-scale application of LMBs.

In addition, in some cases, a polymer may also be present. Various polymeric materials can be used. The polymeric materials may include one or more polymer, one or more co-polymer, or a combination thereof. Molecular weight of the polymer(s) and/or copolymer(s) is not particularly limited. For example, depending on the performance (e. g., ion conductivity) requirement of a devices (e.g., a solid- state, ion-conducting battery), polymer(s) and/or copolymer(s) can have a broad range of molecular weight. It may be desirable that the polymer(s) and/or copolymer(s) be conducting. A polymeric material may include a mixture of conducting polymer(s) and/or copolymer(s) and non-conducting polymer(s) and/or copolymer(s).

Polymeric materials include, but are not limited to, polymers and copolymers. The polymers and copolymers may be conducting or non-conducting. Non-limiting examples of the polymers and the co-polymers include poly (ethylene) (PE), poly (ethylene oxide) (PEO), poly(propylene) (PP), poly(propylene oxide), polymethyl methacrylate (PMMA), polyacrylonitrile (PAN), poly [bis(methoxy ethoxyethoxide)-phosphazene], poly(dimethylsiloxane) (PDMS), cellulose, cellulose acetate, cellulose acetate butylate, cellulose acetate propionate, polyvinylidene difluoride (PVdF), polyvinylpyrrolidone (PVP), polystyrene, sulfonate (PSS), polyvinylchloride (PVC) group, poly(vinylidene chloride) polypropylene oxide, polyvinylacetate, polytetrafluoroethy lene (e.g., Teflon), poly (ethyleneterephthalate) (PET), polyimide, polyhydroxyalkanoate (PHA), PEO containing co-polymers (e.g., polystyrene(PS)-PEO copolymers and poly(m-ethyl methacrylate) (PMMA)-PEO copolymers), polyacrylonitrile (PAN), poly(acrylonitrile-co-methylacrylate), PVdF containing co-polymers (e.g., polyvinylidene-fluoride-co-hexafluoropropylene (PVdF-co-HFP)), PMMA co-polymers (e.g. poly (methylmethacrylate-co-ethylacrylate)). These non-limiting examples also include derivatives of the polymers and copolymers. In various examples, the polymeric material is a combination of two or more of these polymers.

Polymer(s) and/or copolymers can have various structures (e.g., secondary structure). In various examples, polymer(s) and/or copolymer(s) are amorphous, crystalline, or a combination thereof. It may be desirable that the polymer(s) and/or copolymers have low crystallinity.

In various examples, polymer(s) and/or copolymer(s) are the polymer selected from the group consisting of:

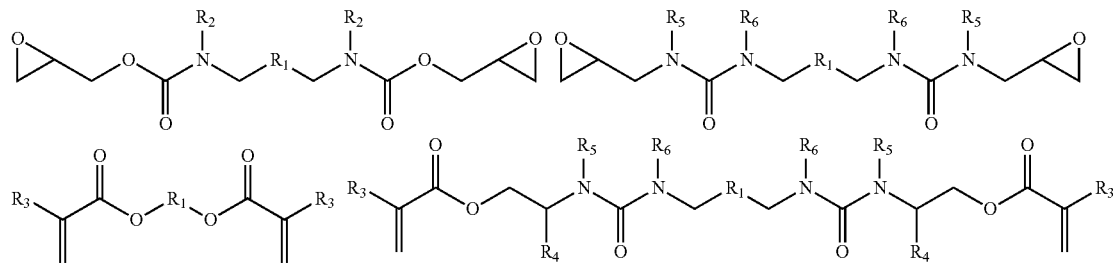

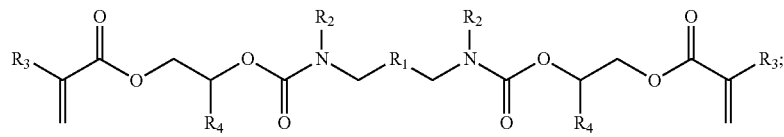

wherein $R_1$ is a structure selected from the group consisting of:

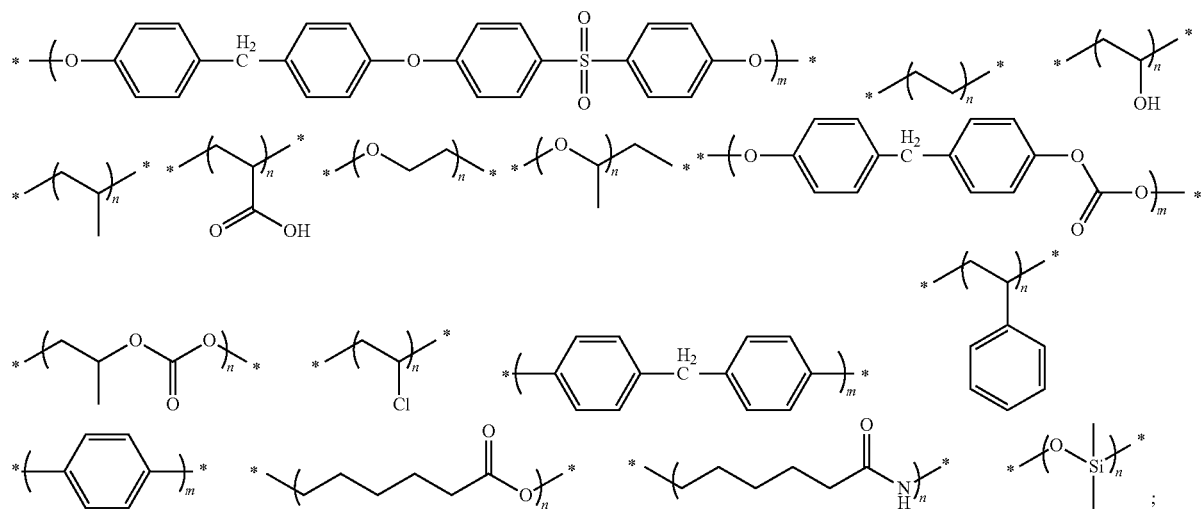

wherein n is an integer between 1 and 10,000, inclusively; m is an integer between 1 and 5,000, inclusively; $R_2$, $R_3$, $R_4$, $R_5$, and $R_6$ are each independently selected from the group consisting of:

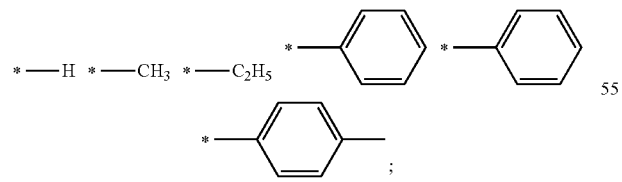

and

* indicates a point of attachment.

In some cases, the polymer may be an ionomer. The ionomer has a backbone group, an anionic substituent, and a cation. Various ionomers can be used, and non-limiting examples of the ionomer include:

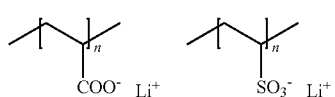

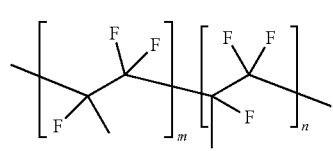

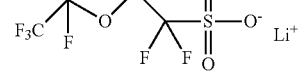

-continued
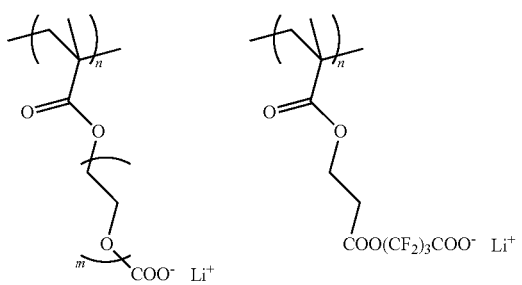
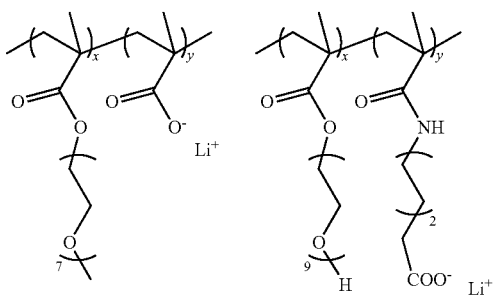
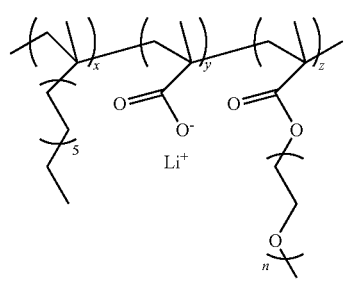
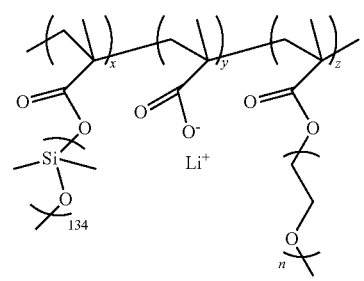
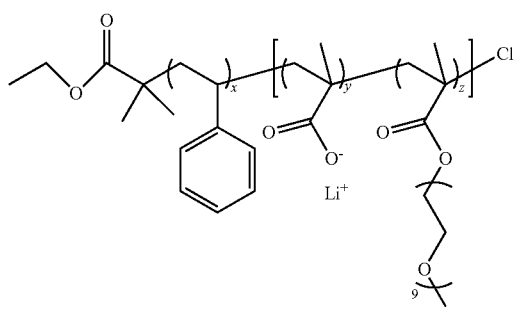
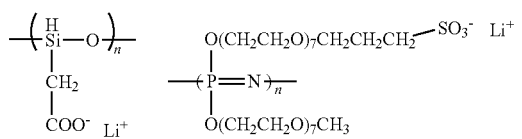
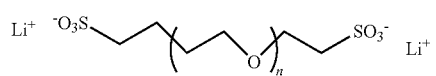
-continued
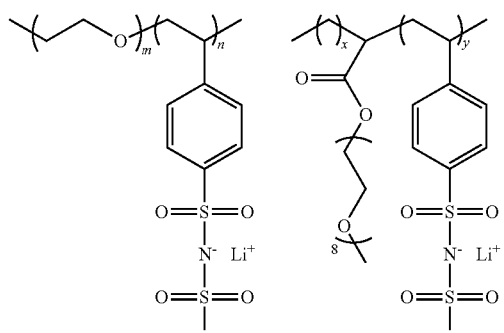
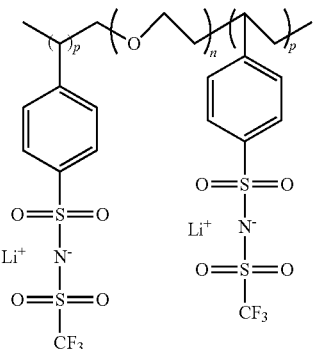
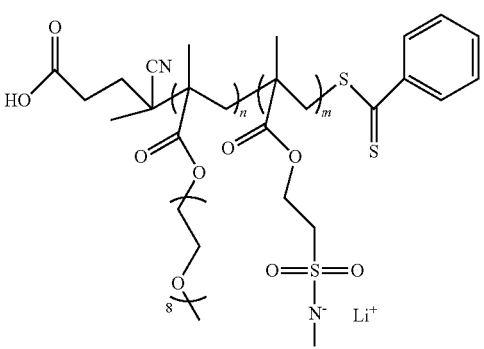
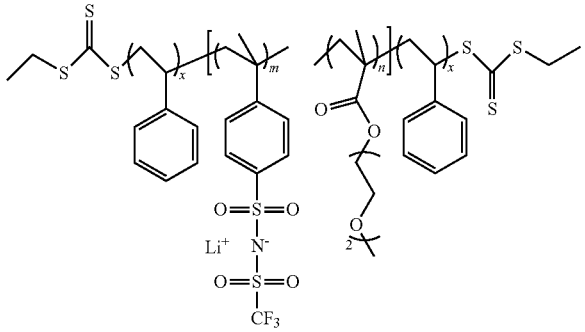
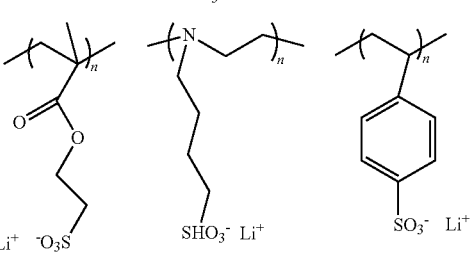

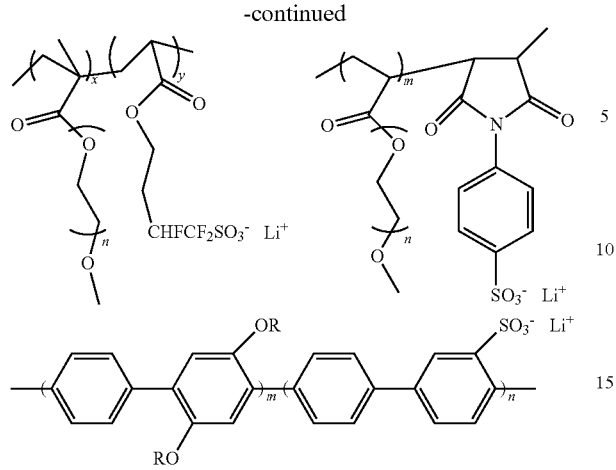
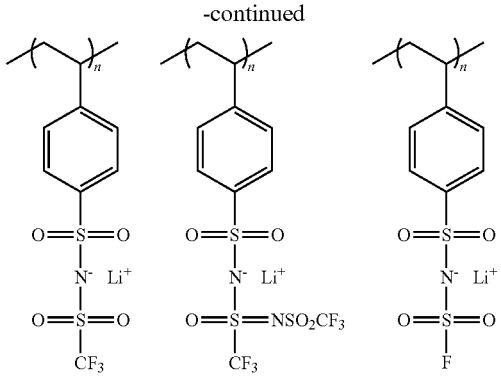
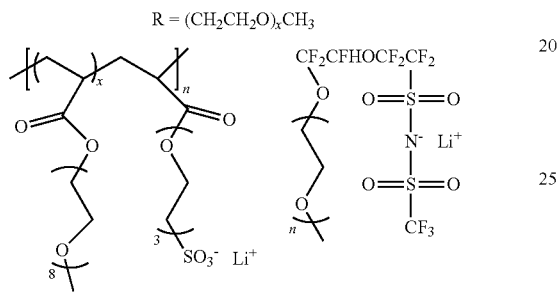
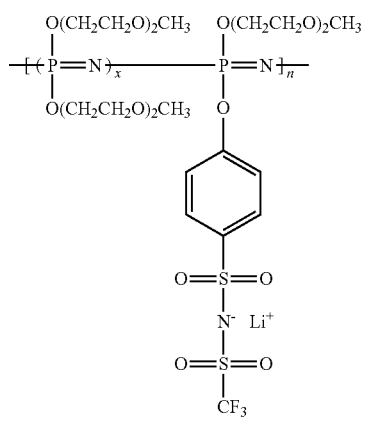
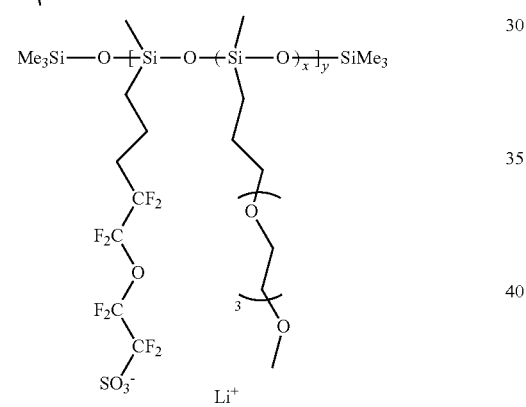
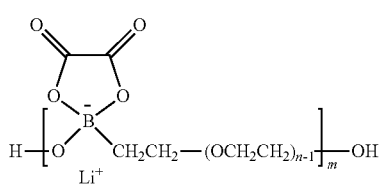
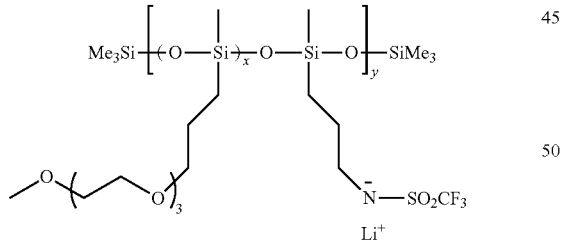
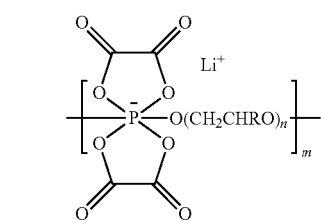
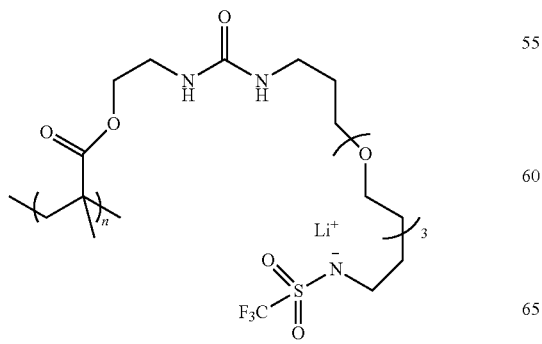
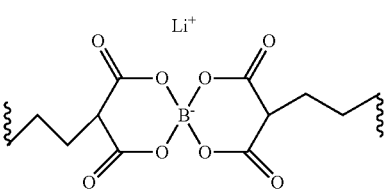

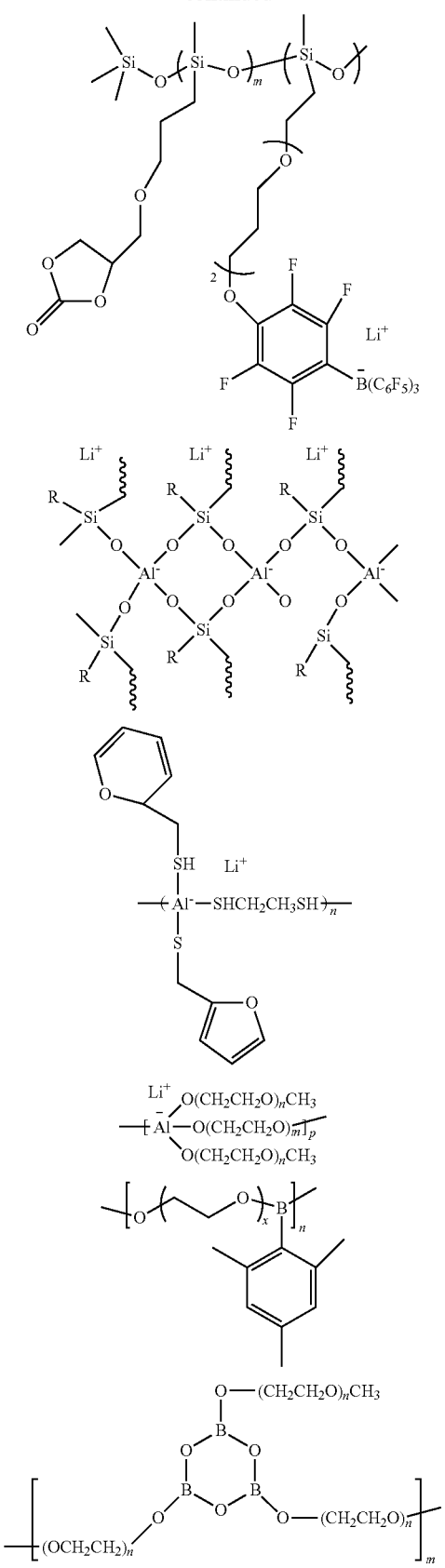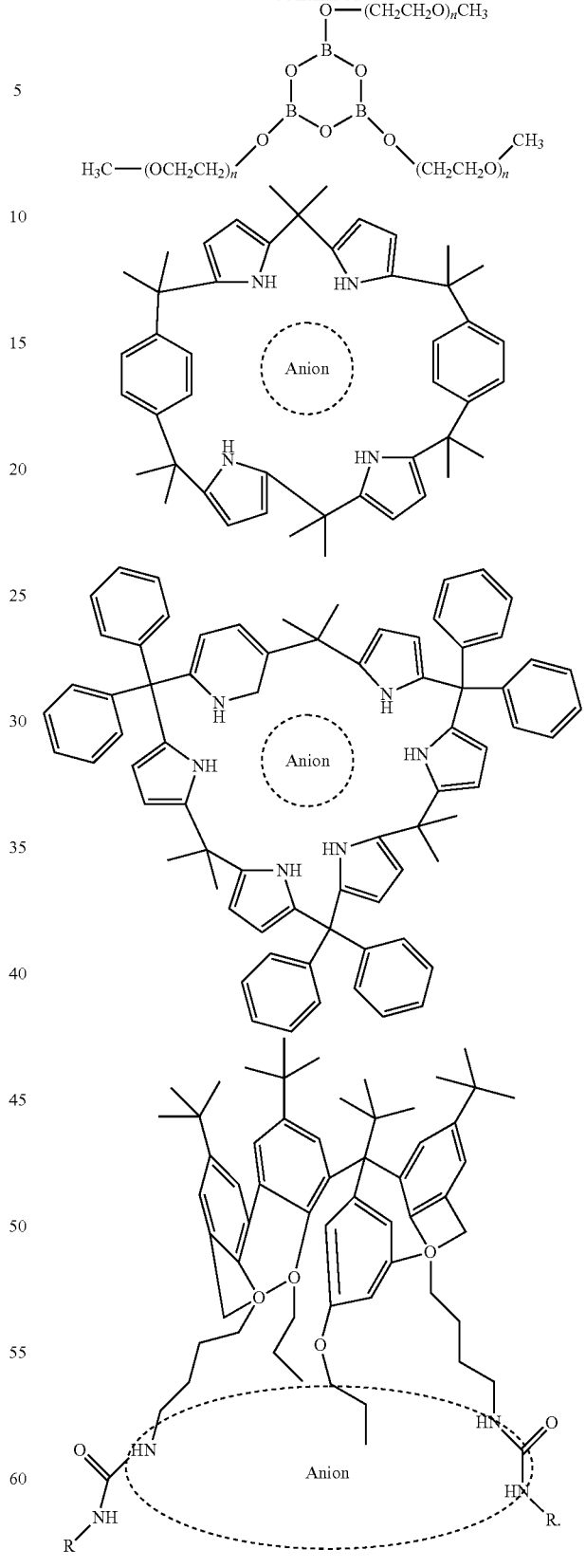
In some cases, the polymer such as those described herein can be present at a concentration of at least 1 wt %, at least 2 wt %, at least 3 wt %, at least 4 wt %, at least 5 wt %, at least 6 wt %, at least 7 wt %, at least 8 wt %, at least 9 wt %, at least 10 wt %, at least 11 wt %, at least 12 wt %, at least 13 wt %, at least 14 wt %, at least 15 wt %, at least 16 wt %, at least 17 wt %, at least 18 wt %, at least 19 wt %, at least 20 wt %, 21 wt %, at least 22 wt %, at least 23 wt %, at least 24 wt %, at least 25 wt %, at least 26 wt %, at least 27 wt %, at least 28 wt %, at least 29 wt %, at least 30 wt %, at least 31 wt %, at least 32 wt %, at least 33 wt %, at least 34 wt %, at least 35 wt %, at least 36 wt %, at least 37 wt %, at least 38 wt %, at least 39 wt %, at least 40 wt %, and/or no more than 40 wt %, no more than 39 wt %, no more than 38 wt %, no more than 37 wt %, no more than 36 wt %, no more than 35 wt %, no more than 34 wt %, no more than 33 wt %, no more than 32 wt %, no more than 31 wt %, no more than 30 wt %, no more than 29 wt %, no more than 28 wt %, no more than 27 wt %, no more than 26 wt %, no more than 25 wt %, no more than 24 wt %, no more than 23 wt %, no more than 22 wt %, no more than 21 wt %, no more than 20 wt %, no more than 19 wt %, no more than 18 wt %, no more than 17 wt %, no more than 16 wt %, no more than 15 wt %, no more than 14 wt %, no more than 13 wt %, no more than 12 wt %, no more than 11 wt %, no more than 10 wt %, no more than 9 wt %, no more than 8 wt %, no more than 7 wt %, no more than 6 wt %, no more than 5 wt %, no more than 4 wt %, no more than 3 wt %, no more than 2 wt %, no more than 1 wt %, etc. It should be noted that the concentrations of the polymers listed above are based on a total weight of the electrolyte.

In addition, in some cases, a plasticizer may also be present.

In some cases, an initiator may be present to facilitate polymerization. For example, the initiator may include a chemical initiator, such as Irgacure initiator, 2,2'-azobis(2-methylpropionitrile), ammonium persulfate, azobisisobutyronitrile, or other initiators known to those of ordinary skill in the art.

In some embodiments, the ionic liquid electrolytes may be cured to form a film, such as a solid-state film. For instance, the ionic liquid electrolytes containing polymers can be formed into a film by curing, for example, using UV light, thermoforming, exposure to elevated temperatures, or the like. For example, the curing may be induced using exposure to UV light for at least 3 min, at least 5 min, at least 10 min, at least 15 min, etc., and/or by exposure to temperatures of at least 20° C. , at least 30° C. , at least 40° C., at least 50° C., at least 60° C., at least 70° C., at least 80° C., at least 90° C., at least 100° C., etc. As an example, the ionic liquid electrolytes containing polymers may be coated or positioned on a surface and/or within a mold and exposed to UV light to allow the polymer to be cured.

In some cases, the ionic liquid electrolytes such as those described herein may provide certain beneficial properties, such as surprisingly high ionic conductivities, compared to other electrolytes. For example, the ionic liquid electrolyte may exhibit ionic conductivities of at least $1\times10^{-8}$ S/cm, at least $2\times10^{-8}$ S/cm, at least $3\times10^{-8}$ S/cm, at least $5\times10^{-8}$ S/cm, at least $1\times10^{-7}$ S/cm, at least $2\times10^{-7}$ S/cm, at least $3\times10^{-7}$ S/cm, at least $5\times10^{-7}$ S/cm, at least $1\times10^{-6}$ S/cm, at least $2\times10^{-6}$ S/cm, at least $3\times10^{-6}$ S/cm, at least $5\times10^{-6}$ S/cm, at least $1\times10^{-5}$ S/cm, at least $2\times10^{-5}$ S/cm, at least $3\times10^{-5}$ S/cm, at least $5\times10^{-5}$ S/cm, at least $1\times10^{-4}$ 5/cm, at least $0.8\times10^{-4}$ S/cm, at least $1.1\times10^{-4}$ S/cm, at least $1.2\times10^{-4}$ S/cm, at least $1.4\times10^{-4}$ S/cm, at least $1.6\times10^{-4}$ S/cm, at least $2\times10^{-4}$ S/cm, at least $3\times10^{-4}$ S/cm, at least $5\times10^{-4}$ S/cm, at least $1\times10^{-3}$ S/cm, at least $2\times10^{-3}$ S/cm, at least $3\times10^{-3}$ S/cm, at least $5\times10^{-3}$ S/cm, etc. In one embodiment, for example, the polymer solid electrolyte has ionc conductivity in between $2.1\times10^{-6}$ S/cm and $5.2\times10^{-6}$ S/cm. In another embodiment, the ionic conductivity may be between $1\times10^{-8}$ and $1\times10^{-2}$ S/cm. Ionic liquids are low-temperature molten salts, that is, liquids composed of ions only. The salts are characterized by weak interactions, owing to the combination of a large cation and a charge-delocalized anion. This results in a low tendency to crystallize due to flexibility (anion) and dissymmetry (cation). Thus, the ionic liquid electrolytes have an ionc conductivity comparable to many organic electrolyte solutions In some embodiments, the electrolytes such as those described herein may provide relatively high oxidation potentials. The electrolytes with relatively high oxidation potentials may be particularly useful, for example, in applications where higher voltages are required. In certain cases, the oxidation potential of the ionic liquid electrolyte may be at least 0.3 V, at least 0.4 V, at least 0.5 V, at least 0.6 V, at least 0.7 V, at least 0.8 V, at least 0.9 V, at least 1 V, at least 1.5 V, at least 2 V, at least 2.5 V, at least 3 V, at least 3.5 V, at least 3.8 V, at least 4 V, at least 4.5 V, at least 5.0 V, at least 5.1 V, or at least 5.5 V. Oxidation potentials can be tested using standard techniques known to those of ordinary skill in the art, such as cyclic voltammetry. Without wishing to be bound by any theory, it is believed that the electrolyte with high oxidation potentials is very stable at high voltages, which makes it a good candidate for high-voltage cathode materials, such as $LiNi_{0.5}Mn_{1.5}O_4$. Thus, it is suitable for high voltage lithium ion battery.

In addition, in some embodiments, the ionic liquid electrolytes such as those described herein may provide relatively high flash point. Electrolytes with relatively high flash point may be particularly useful, for example, in applications where higher flash point are required. In certain cases, the flash point of the electrolyte may be at least 85° C., at least 90° C., at least 93.3° C., at least 95° C., at least 100° C., at least 105° C., at least 110° C., at least 115° C., at least 120° C., at least 125° C., at least 130° C., at least 135° C., at least 140° C., at least 145° C., at least 150° C., at least 155° C., at least 160° C., at least 165° C., at least 170° C., at least 175° C., at least 180° C., at least 185° C., at least 190° C., at least 195° C., at least 200° C., etc. Flash point can be tested using standard techniques known to those of ordinary skill in the art. Without wishing to be bound by any theory, it is believed that electrolytes with relatively high flash point can be used at high temperature, which may help to improve the safety of the electrolytes.

In addition, in some embodiments, electrolytes such as those described herein may work at a temperature of at least 85° C., at least 90° C., at least 93° C., at least 95° C., at least 100° C., at least 105° C., at least 110° C., at least 115° C., at least 120° C., at least 125° C., at least 130° C., at least 135° C., at least 140° C., at least 145° C., at least 150° C., at least 155° C., at least 160° C., at least 165° C., at least 170° C., at least 175° C., at least 180° C., at least 185° C., at least 190° C., at least 195° C., at least 200° C., etc. The electrolyte is highly stable at high temperature, which makes it a good candidate for high temperature lithium batteries.

The present disclosure generally relates to a device with various ionic liquid electrolyte mentioned above. The device may be a battery. The battery may be an ion-conducting battery. The battery may be configured for applications such as, portable applications, transportation applications, stationary energy storage applications, and the like. Non-limiting examples of the ion-conducing batteries include lithium-ion conducting batteries, sodium-ion conducting batteries, magnesium-ion conducing batteries, and the like.

The device may also be a battery comprising one or more lithium ion electrochemical cells.

In various examples, a battery may be an anode-free rechargeable battery including an electrolyte of the present disclosure, a current collector, and a cathode with an electroactive material. In some embodiments, the current collector includes copper, nickel, iron, or stainless steel.

In some embodiments, the anode-free rechargeable battery further includes a cathode current collector, and non-limiting examples of the cathode current collector includes aluminum, nickel, titanium, stainless steel, or carbon paper.

In addition, the present disclosure generally relates to a method of forming the anode-free rechargeable battery including at least the following steps. A pre-assembled cell with an anode current collector and a cathode is formed. A mixture of liquid electrolyte and monomer or polymer in a liquid phase of the electrolyte is introduced into the pre-assembled cell. Then, a thermal gelation process is performed to form the anode-free rechargeable battery. In some embodiments, the thermal gelation process includes a physical gelation process, a monomer polymerization process, a polymer cross-linking process, or a combination thereof. In some embodiments, the anode current collector is pre-lithiated to compensate for Li loss during cycling. In some embodiments, the cathode is over-lithiated with lithium to compensate for Li loss during cycling.

In various examples, a battery includes an electrolyte of the present disclosure, an anode, and a cathode with an electroactive material.

The anode material may be a conducting material. Non-limiting examples of the conducting materials include conducting carbon materials, tin and its alloys, tin/carbon, tin/cobalt alloys, silicon/carbon materials, and the like. Non-limiting examples of the conducing carbon materials include graphite, hard carbon porous hollow carbon spheres and tubes (e.g., carbon nanotubes), and the like.

The anode may be a metal. Non-limiting examples of the metals include lithium metal, sodium metal, magnesium metal, and the like.

A cathode includes one or more of the electroactive material in electrical contact with the electrolyte. Various electroactive material can be used. Combinations of the electroactive material may be used. The electroactive material may be a lithium ion-conducting material. Non-limiting examples of the lithium ion-conducting cathode materials include lithium nickel cobalt manganese oxide, lithium nickel cobalt aluminum oxide, lithium titanate, metallic lithium, lithium metal oxide, lithium manganese oxide, lithium cobalt oxide and lithium iron phosphate, or the like.

The present disclosure generally relates to a method of forming a battery including at least the following steps. A mixture of liquid electrolyte and monomer or polymer in a liquid phase is introduced into a pre-assembled cell without electrolyte. Then, a thermal gelation process is performed to form the battery. In some embodiments, the thermal gelation process includes a physical gelation process, a monomer polymerization process, a polymer cross-linking process, or a combination thereof.

In addition, in some embodiments, the battery has a capacity retention of at least 41%, at least 46%, at least 51%, at least 56%, at least 62%, at least 67%, at least 72%, at least 77%, at least 82%, at least 87%, at least 92%, at least 95%, at least 97%, or the like when a discharging current rate of 0.5 C is being used.

In addition, in some embodiments, after 200 cycles of using the discharging current rate of 0.5 C, the battery has a capacity retention of at least 60%, at least 72%, at least 77%, at least 82%, at least 83%, at least 84%, at least 85%, at least 86%, at least 87%, at least 88%, at least 89%, at least 90%, or the like.

The following documents are incorporated herein by reference in their entireties: Int. Pat. Ser. Apl. No. PCT/US16/52627, entitled "High Performance Nickel-Based Positive Electroactive Material for a Lithium-Ion Battery," published as Int. Pat. Apl. Pub. No. WO 2017/053275; Int. Pat. Apl. Ser. No. PCT/US17/66381, entitled "Electroactive Materials for Lithium-Ion Batteries and Other Applications," published as Int. Pat. Apl. Pub. No. WO 2018/112182; Int. Pat. Apl. Ser. No. PCT/US18/18986, entitled "Core-Shell Electroactive Materials," published as Int. Pat. Apl. Pub. No. WO 2018/156607; U.S. patent application Ser. No. 16/037,041, entitled "Ionomer Electrode Manufacturing Slurry," published as U.S. Pat. Apl. Pub. No. 2019/0020033; U.S. patent application Ser. No. 16/059,251, entitled "Poly (Lithium Acrylate) and Other Materials for Membranes and Other Applications," published as U.S. Pat. Apl. Pub. No. 2019/0051939; U.S. patent application Ser. No. 16/240,502, entitled "Polymer Solid Electrolyte"; a U.S. patent application filed on even date herewith, entitled "Electrodes for Lithium-Ion Batteries and Other Applications"; a U.S. patent application filed on even date herewith, entitled "Composition, Article, Method of Forming Article, Anode-free Rechargeable Battery and Forming Method Thereof, and Battery"; and a U.S. patent application filed on even date herewith, entitled "Electrolytes for High-voltage Cathode Materials and Other Applications." The following are incorporated herein by reference in its entirety: U.S. patent application Ser. No. 16/240,502, filed on Jan. 4, 2019, entitled "POLYMER SOLID ELECTROLYTES"; and U.S. Provisional Patent Application Ser. No. 62/757,133, filed on Nov. 7, 2018, entitled "Polymer Solid Electrolytes," by Huang et al.

The following examples are intended to illustrate certain embodiments of the present invention, but do not exemplify the full scope of the invention.

EXAMPLES 1, 2, AND 3

These Examples provide descriptions of ionic liquid electrolytes of the present disclosure. These Examples also provide examples of making and characterization of said electrolytes. The ionic liquid electrolyte was obtained by mixing an ionic liquid and 4M lithium salts (lithium bis (fluorosulfonyl)imide (LiFSI)) by mechanical stirring at room temperature in the liquid state. The ionic liquid in Example 1 is Py14FSI, the ionic liquid in Example 2 is Py13FSI, and the ionic liquid in Example 3 is IM12FSI. FIG. 1 illustrates cycling performance curves of the electrolytes of Examples 2, 3 and the Comparative Example 1. The electrolyte in Example 1 has an ionic conductivity of $4.8 \times 10^{-3}$ S/cm, the electrolyte in the Example 2 has an ionic conductivity of $8.2 \times 10^{-3}$ S/cm, and the electrolyte in Example 3 has an ionic conductivity of $1.54 \times 10^{-2}$ S/cm,

EXAMPLES 4, 5, AND 6

An ionic liquid electrolyte was obtained by mixing an ionic liquid, 1,2-dimethoxyethane (DME) (4:1 by weight), and 4M lithium salts lithium bis(fluorosulfonyl)imide (LiFSI) by mechanical stirring at room temperature in an MBRAUN LABmaster glove box with an Ar (argon) atmosphere (<1 ppm $O_2$ and <1 ppm $H_2O$) in the liquid state. The ionic liquid in Example 4 is Py13FSI, the ionic liquid in Example 5 is IM12FSI, and the ionic liquid in Example 6 is Py14FSI.

EXAMPLES 7 AND 8

Figure 2:
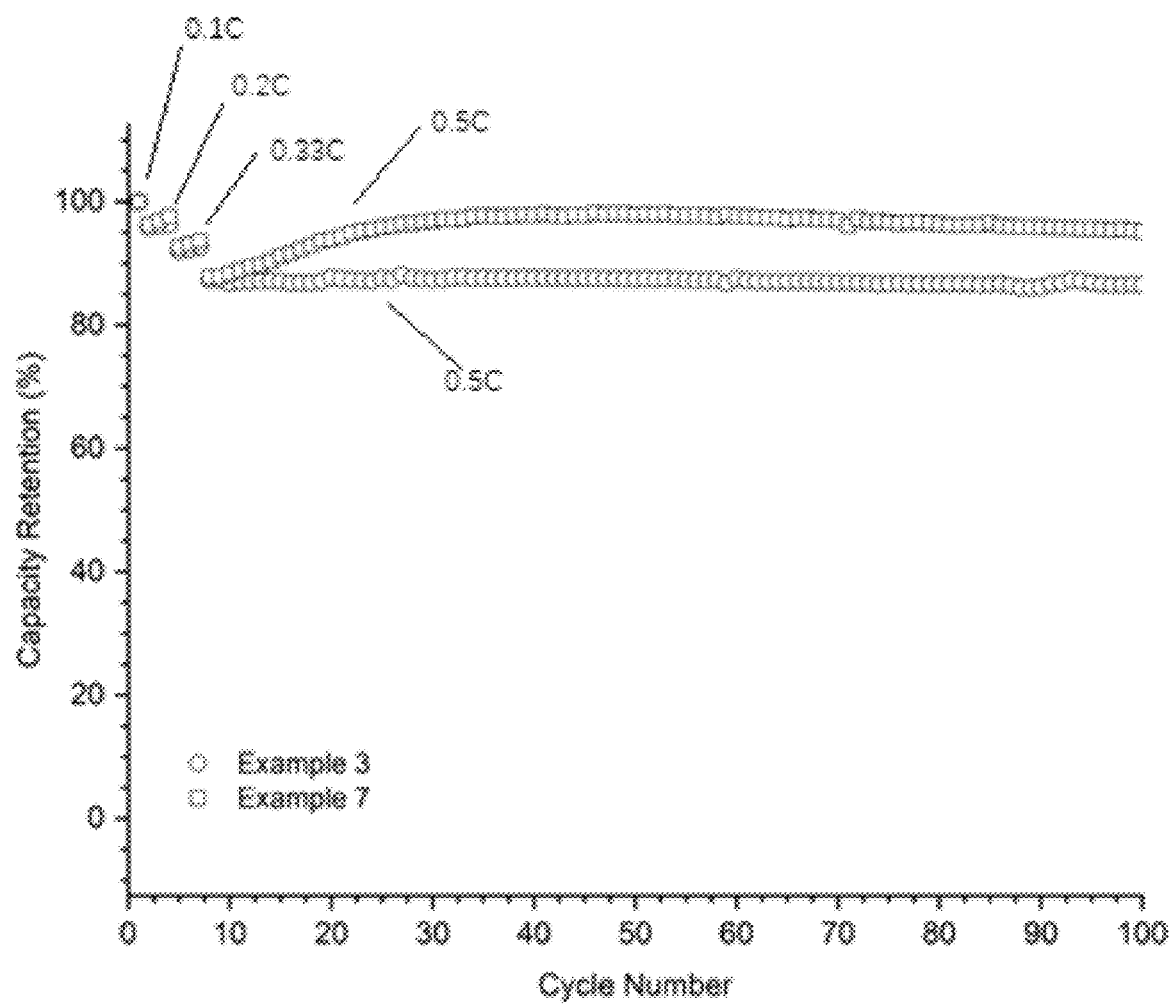
FIG. 2 illustrates cycling performance curves of electrolytes of certain embodiments of the disclosure.

An ionic liquid electrolyte was obtained by mixing an ionic liquid, 0.1M LiBOB (~3.0 wt %), and 4M LiFSI by mechanical stirring at room temperature in the liquid state. The ionic liquid in Example 7 is IM12FSI and the ionic liquid in Example 8 is Py14FSI. FIG. 2 illustrates cycling performance curves of the electrolytes of Example 3 and Example 7.

As shown in FIG. 2, the capacity retention reached 90% for Example 7 with LiBOB as additives and the capacity retention was 85% for Example 3 with no additives. The cycle life of Example 7 is improved by adding LiBOB as additives.

EXAMPLES 9 AND 10

Figure 3:
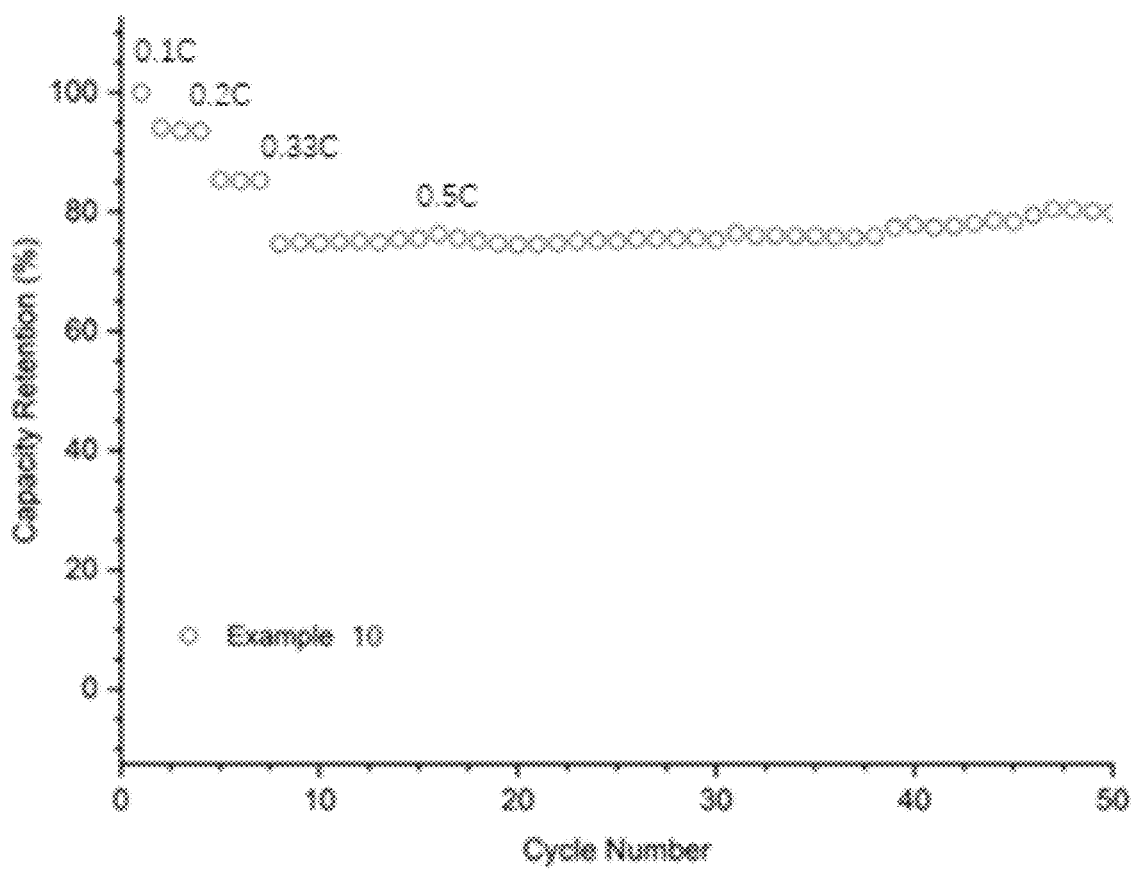
FIG. 3 illustrates a cycling performance curve of an electrolyte of other embodiments of the disclosure.

An ionic liquid electrolyte was obtained by mixing ionic liquid IM12FSI, additives, 0.1M (~3 wt %) LiBOB, and 4M LiFSI by mechanical stirring at room temperature in the liquid state. The additives in Example 9 is ethylene carbonate (EC) and a ratio of IM12FSI to EC is 4:1 by weight, the additives in Example 10 is sulfolane (SL) and a ratio of IM12FSI to SL is 10:1 by weight. FIG. 3 illustrates a cycling performance curve of the electrolyte of Example 10. As shown in FIG. 3, the capacity retention reached 80% for Example 10.

EXAMPLES 11-14

An ionic liquid electrolyte was obtained by mixing ionic liquid IM12FSI and lithium salt lithium bis(fluorosulfonyl) imide (LiFSI) having a certain concentration by mechanical stirring at room temperature in the liquid state, The concentration of LiFSI in Example 11 is 1M and the electrolyte in Example 11 has an ionic conductivity of $6 \times 10^{-3}$ S/cm. In Example 11, the battery can cycle more than 200 cycles at both room temperature and a temperature of more than 85° C. The capacity retention reached 59% for Example 11 at room temperature.

The concentration of LiFSI in Example 12 is 2M and the electrolyte in Example 12 has an ionic conductivity of $5.2 \times 10^{-3}$ S/cm. In Example 12, the battery can cycle more than 200 cycles at both room temperature and a temperature of more than 85° C. The capacity retention reached 68% for Example 12 at room temperature, The concentration of LiFSI in Example 13 is 3M and the electrolyte in the Example 13 has an ionic conductivity of $3.1 \times 10^{-3}$ S/cm. In Example 13, the battery can cycle more than 200 cycles at both room temperature and a temperature of more than 85° C. The capacity retention reached 73% for Example 13 at room temperature.

The concentration of LiFSI in Example 14 is 4M and the electrolyte in the Example 14 has an ionic conductivity of $2.2 \times 10^{-3}$ S/cm. In Example 14, the battery can cycle more than 200 cycles at both room temperature and a temperature of more than 85° C. The capacity retention reached 85% for Example 14 at room temperature.

EXAMPLES 15-19

An ionic liquid electrolyte was obtained by mixing ionic liquid IM12FSI, 4M ionic liquid-based lithium salt LiFSI, and 2 wt % of additive by mechanical stirring at room temperature in the liquid state.

The additive in Example 15 is vinylene carbonate (VC). The electrolyte in Example 15 has an ionic conductivity of $2.2 \times 10^{-3}$ S/cm, an oxidation potential of 4.3 V, and a flash point of more than 200° C. In Example 15, the battery can cycle more than 350 cycles at both room temperature and a temperature of more than 85° C.

The additive in Example 16 is fluoroethylene carbonate (FEC). The electrolyte in Example 16 has an ionic conductivity of $2.5 \times 10^{-3}$ S/cm, an oxidation potential of 4.3 V, and a flash point of more than 200° C. In Example 16, the battery can cycle more than 350 cycles at both room temperature and a temperature of more than 85° C. The capacity retention reached 88% for Example 16 at room temperature.

Figure 4:
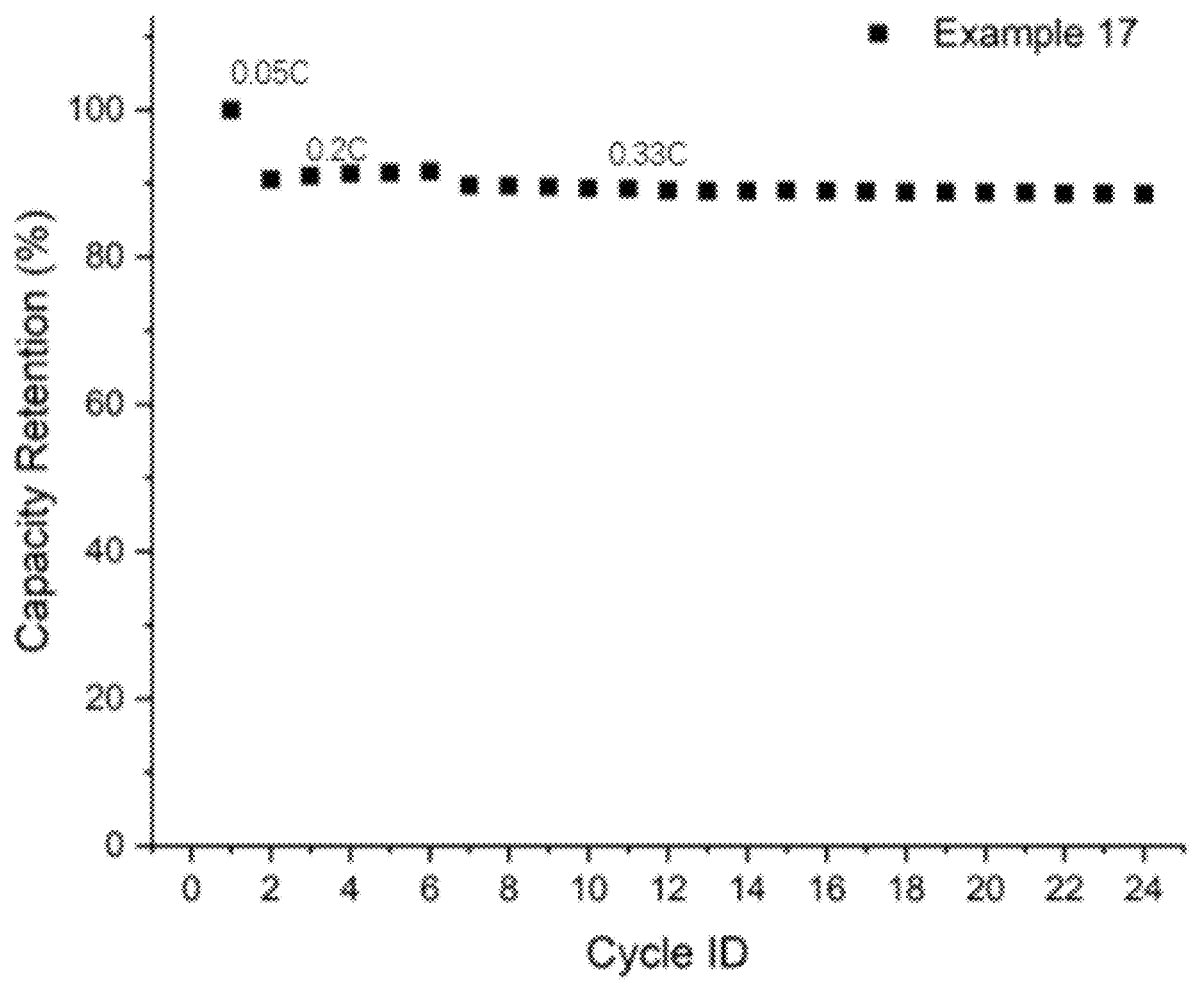
FIG. 4 illustrates a cycling performance curve of an electrolyte of certain embodiments of the disclosure.

The additive in Example 17 is prop-1-ene-1,3-sultone (PES). The electrolyte in Example 17 has an ionic conductivity of $2.7 \times 10^{-3}$ S/cm, an oxidation potential of 4.3 V, and a flash point of more than 200° C. In Example 17, the battery can cycle more than 350 cycles at both room temperature and a temperature of more than 85° C. FIG. 4 illustrates a cycling performance curve of the electrolyte of Example 17 at a current rate of 0.05 C, 0.2 C, and 0.33 C. As shown in FIG. 4, the capacity retention reached 89% for Example 17 at room temperature with a current rate of 0.33 C.

The additive in Example 18 is N-methylacetamide (NMA). The electrolyte in the Example 18 has an ionic conductivity of $2.6 \times 10^{-3}$ S/cm, an oxidation potential of 4.3 V, and a flash point of more than 200° C. In Example 18, the battery can cycle more than 350 cycles at both room temperature and a temperature of more than 85° C. The capacity retention reached 86% for Example 18 at room temperature.

The additive in Example 19 is sulfolane (SL). The electrolyte in Example 19 has an ionic conductivity of $2.8 \times 10^{-3}$ S/cm, an oxidation potential of 4.3 V, and a flash point of more than 200° C. In Example 19, the battery can cycle more than 350 cycles at both room temperature and a temperature of more than 85° C. The capacity retention reached 88% for Example 19 at room temperature.

The capacity/capacity retention is improved and the cycle life is prolonged after the introduction of the additive.

EXAMPLES 20 AND 21

A solid polymer electrolyte (SPE) was obtained by mixing a polymer, 1 wt % of Azobisisobutyronitrile (AIBN), ionic liquid IM13FSI, and 4M ionic liquid-based lithium salt LiFSI by mechanical stirring at room temperature in the liquid state. The polymer has a structure shown below and the synthesis of the non-ionic polymer may be referred to Example 5 of the solid-state electrolyte in U.S. Provisional patent application Ser. No. 62/757,133:

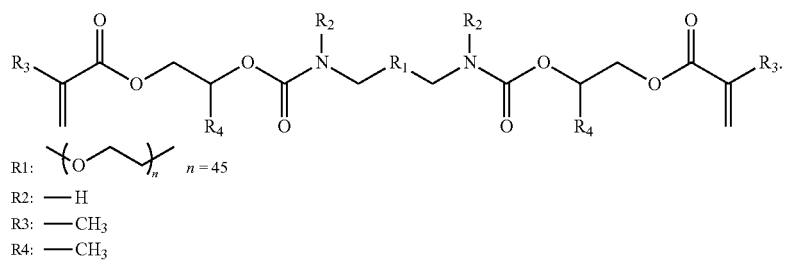

R1: ⎯(O⎯)$_n$ n = 45
R2: ⎯H
R3: ⎯CH$_3$
R4: ⎯CH$_3$

The concentration of the non-ionic polymer in Example 20 is 5 wt % and the concentration of the non-ionic polymer in Example 21 is 10 wt %. The mixture was applied to a PET thin film. In particular, a solid-state electrolyte film was obtained by performing UV-curing for 5 min.

The electrolyte in Example 20 has an ionic conductivity of $0.9 \times 10^{-3}$ S/cm, an oxidation potential of 4.3 V, and a flash point of more than 200° C. In Example 20, the battery can cycle more than 100 cycles at a temperature of more than 85° C. and has a capacity retention of 77%.

The electrolyte in Example 21 has an ionic conductivity of $0.7 \times 10^{-3}$ S/cm, an oxidation potential of 4.3 V, and a flash point of more than 200° C. In Example 21, the battery can cycle more than 100 cycles at a temperature of more than 85° C. and has a capacity retention of 74%.

EXAMPLES 22-23

A solid polymer electrolyte (SPE) was obtained by mixing an ionomer, 1 wt % of AIBN, ionic liquid IM13FSI, and 4M lithium salt LiFSI by mechanical stirring at room temperature in the liquid state. The mixture was applied to a PET thin film. In particular, a solid-state electrolyte film was obtained by performing UV-curing for 5 min.

The ionic liquid in Example 22 is IM13FSI, the polymer in Example 22 is 10 wt % of poly lithium acrylate (PLA, an ionomer which has carboxylate —CO$_2^-$ anions covalently bonded to the polymer), and the polymer has a structure shown below:

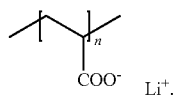

The electrolyte in Example 22 has an ionic conductivity of $1.2 \times 10^{-3}$ S/cm, an oxidation potential of 4.3 V, and a flash point of more than 200° C. In Example 22, the battery can cycle more than 150 cycles at a temperature of more than 85° C. and has a capacity retention of 85% when a discharging current rate of 0.5 C is being used.

The ionic liquid in Example 23 is IM13FSI, the polymer in Example 23 is 5 wt % of Lithion (an ionomer which has sulfonate anions —SO$_3^-$ covalently bonded to the polymer), and the polymer has a structure shown below:

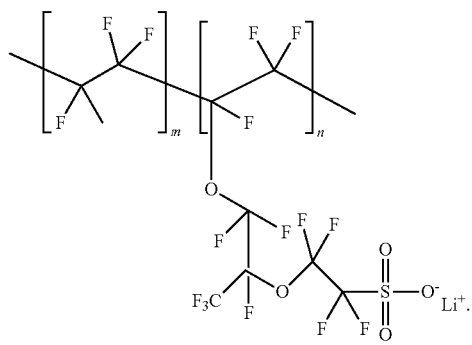

The sulfonate anion shows a high degree of negative charge delocalization. By incorporating effective electron-withdrawing groups, a facile mobility of the Li$^+$ ions may be effectively provided, thereby giving remarkably good conductivity levels. The electrolyte in Example 23 has an ionic conductivity of $1.7 \times 10^{-3}$ S/cm, an oxidation potential of 4.3 V, and a flash point of more than 200° C. In Example 23, the battery can cycle more than 150 cycles at a temperature of more than 85° C. and has a capacity retention of 82%.

COMPARATIVE EXAMPLE 1

Comparative Example 1 is a conventional carbonate electrolyte having 1M lithium hexafluorophosphate (LiPF$_6$) in a mixture of ethylene carbonate (EC) and diethyl carbonate (DEC) (1:1 by weight).

COMPARATIVE EXAMPLES 2 AND 3

Comparative Examples 2 and 3 are electrolyte based on conventional carbonate. The electrolytes were obtained by mixing a non-ionic polymer which can be obtained commercially and 1M lithium hexafluorophosphate (LiPF6) in a mixture of ethylene carbonate (EC) and diethyl carbonate (DEC) (1:1 by weight). The mixture was applied to a PET thin film. In particular, a solid-state electrolyte film was obtained by performing UV-curing for 5 min. The non-ionic polymer has a structure shown below:

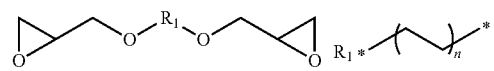

The concentration of the non-ionic polymer in Comparative Example 2 is 5 wt %. The electrolyte in the Comparative Example 2 has an ionic conductivity of $1.2 \times 10^{-4}$ S/cm, an oxidation potential of less than 4.2 V, and a flash point of less than 70° C. In Comparative Example 2, the battery cycling performance is poor (can only work at a temperature of less than 40° C. and has a capacity retention of 45%). In Comparative Example 2, the battery cannot cycle at a temperature of more than 40° C.

The concentration of the polymer in Comparative Example 3 is 10 wt %. The electrolyte in the Comparative Example 3 has an ionic conductivity of $9.4 \times 10^{-5}$ S/cm, an oxidation potential of less than 4.2 V, and a flash point of less than 70° C. In Comparative Example 3, the battery cycling performance is poor (can only work at a temperature of less than 40° C. and has a capacity retention of 37%). In Comparative Example 3, the battery cannot cycle at a temperature of more than 40° C.

The electrochemical impedance spectroscopy, cycling performance, electrochemical stabilities, and safety performance of all of the Examples and the Comparative Examples were determined using measurement methods and conditions below.

Electrochemical Impedance Spectroscopy: Electrochemical impedance spectroscopy testing was performed by AC impedance analyzer (Interface 1010E Potentiostate, Gamry). The samples with an effective area of 1 cm$^2$ were placed in 2032 coin-type cells. The ionic conductivity was measured in a frequency range of 13 MHz to 5 Hz by a bias voltage of 10 mV. The ionic conductivity can be calculated with the known thickness and area of the membrane.

Cycling performance: The electrolytes in all of the Examples and the Comparative Examples were assembly in a 2032-coin cell with NMC811 as cathode (2 mAh/cm$^2$) and lithium foil as anode for Examples 1-19 and Comparative Example 1, graphite as anode for Examples 20-23 and Comparative Examples 2 and 3, and commercial celgard separator as separator for Example 1-19. The Examples 20-23 and the Comparative Examples 2-3 were assembly in a solid battery with no separator, and each cell was then charged and discharged for 200 cycles between 4.5 V and 2.8 V using a Neware tester. The capacity retention was tested at a current rate of 0.5 C. The electrolytes in certain Examples were also tested at a current rate of 0.05 C, 0.1 C, 0.2 C, 0.33 C, as shown in FIGS. 1-4.

Electrochemical stability: Electrochemical stability testing was performed using cyclic voltammetry measurements with an AC impedance analyzer (Interface 1010E Potentiostate, Gamry). Samples with an area of 1.54 cm$^2$ were sealed between a stainless-steel plate and a lithium foil (reference electrode). The charge/discharge window range was from 2.8 to 4.4 V with a scan rate of 10 mV/s. The experiment was conducted at room temperature.

Compared with Comparative Examples 1, 2, and 3, in Examples 1-23, the ionic liquid (IM12FSI or IM13FSI) was introduced in the electrolyte and lithium bis(fluoromethane-sulfonyl)imide (LiFSI) was chosen as the salt because of its high solubility (even in suitable polymer hosts; LiTFSI has the same anion with IM13FSI, which is also good for solubility), good ion transport properties, and wide electrochemical stability. According to the test data, the introduction of the ionic liquid can improve various performances of the electrolyte.

On one aspect, all of the ionic liquid electrolytes in Examples 1-23 have surprisingly higher ionic conductivities than that of the Comparative Examples. The ionic liquid enhances the room temperature ionic conductivity of the electrolytes above $10^{-3}$ S/cm.

Furthermore, the polymers in Examples 22 and 23 are ionomer. The ionomers, which have anions covalently bonded to the polymer, organic backbone, or immobilized by anion acceptors, have various advantages for application in LMBs, such as high Li-ion transference number, absence of detrimental effect of anion polarization, and low rate of Li dendrite growth. According to the test data, the ionomer can improve various performances of the electrolyte. Mixing the ionomer with the ionic liquid can gain some advantages of both parties. By controlling the ratio of the ionomers and the ionic liquid to optimize the best combination of concentration and mobility of Li$^+$ ions, the ionic conductivities at room temperature reached $1.7 \times 10^{-3}$ S/cm for Example 22 and the ionic conductivity at room temperature reached $1.2 \times 10^{-3}$ S/cm for example 23, while the ionic conductivities at room temperature reached $1.2 \times 10^{-4}$ S/cm for Comparative Example 2 and the ionic conductivities at room temperature reached $9.4 \times 10^{-5}$ S/cm for Comparative Example 3. The solid polymer electrolytes (SPEs) based on ionomer in Examples 22 and 23 have surprisingly higher ionic conductivities than the SPEs in both Comparative Examples 2, 3 and Examples 20, 21. This indicates that incorporation of an ionomer provides a facile mobility of the Li$^+$ ions, thereby giving remarkably good conductivity levels of SPEs.

On another aspect, all of the ionic liquid electrolytes in Examples 1-23 exhibit better cycling performance in an electrochemical cell at both room temperature and higher working temperature (>85° C.) than that of the Comparative Examples. The Comparative Examples cannot cycle at a temperature more than 40° C. The foregoing fact illustrates that the ionic liquid electrolyte is highly stable at high temperature, which makes it a good candidate for high temperature lithium batteries.

When the ionic liquid is used in combination with ionic liquid based salt lithium bis(fluorosulfonyl)imide (LiFSI), the electrolytes exhibit protective solid electrolyte interphase (SEI). SEI in ionic liquid electrolyte is the electrode passivation as a result of a chemical reaction, because the electrode surface can also be passivated electro-lessly. This provides more flexibility for ionic liquids to form protective SEI. In this case, the resulting SEI can provide an excellent cyclability. Besides, the ionic liquid with high viscosities may deliver better battery performance in term of specific capacity/capacity retention.

Furthermore, different additives were introduced in the ionic liquid electrolytes to further improve the cycling performance. Mixing additives with the ionic liquid can gain some advantages of both parties. By controlling the ratio of the additives to optimize the best combination of concentration, the capacity retention reached 89% for Example 7 with LiBOB as additives, and the cycle life is improved. The capacity retention reached 88% for Example 16 with FEC as additives, the capacity retention reached 89% for Example 17 with PES as additives, the capacity retention reached 86% for Example 18 with NMA as additives, and the capacity retention reached 88% for Example 19 with SL as additives, while the capacity retention reached 59% for Example 11 with no additives, the capacity retention reached 68% for Example 12 with no additives, the capacity retention reached 73% for Example 13 with no additives, and the capacity retention reached 85% for Example 14 with no additives. The incorporation of organic carbonates additives, such as VC, FEC, prop-1-ene-1,3-sultone (PES), NMA, can significantly enhance the wettability of electrodes in the corresponding electrolytes. This directly improves the battery performance to achieve higher capacities in comparison with pure IL electrolyte without organic carbonates additives. Organic carbonates have excellent stability at negative potentials, and the presence of organic carbonates is able to extend the electrochemical stability of ILs towards negative potentials. Mixing ionic liquids with organic carbonates can gain some advantages of both parties. A small amount of organic carbonates can significantly improve the battery performance of ionic liquids because the presence of organic additives increases the ionic mobility by lowering the lithium coordination, while the electrolyte is still non-flammable since the content of IL is high enough in this mixture.

The sulfolane (SL) was introduced in the ionic liquid electrolytes in Example 19. The incorporation of sulfolane can improve the oxidation potential since sulfolane is a highly polar aprotic solvent with high thermal and voltage stability windows. The improved oxidation potential of the electrolytes may provide enhanced stability in ionic liquid electrolyte, which may provide safer, longer lifetime and/or higher voltage lithium batteries.

On one aspect, the ionic liquid electrolytes in all of the Examples have surprisingly higher flash point than the Comparative Examples. The flash point is improved to more than 200° C. after the ionic liquid was used, indicating these electrolytes have the advantages of high-temperature resistance and non-flammability. As such, the safety of the ionic liquid electrolyte is significantly improved compared to the conventional electrolytes for lithium-ion battery. The introduction of ionic liquids can prevent fire and explosion caused by the excessive rise of temperature in the battery, thereby making the electrolyte nonflammable to improve the safety of the battery. The low flammable electrolyte can provide enhanced safety for all lithium metal and lithium ion batteries. The electrolytes can also be used in LIBs and other batteries to significantly improve their safety and cyclability. The unique properties of ionic liquid electrolytes may help to solve the problem as they are practically non-flammable, which is a significant safety asset. The replacement of the conventional flammable and volatile organic solutions with ionic-liquid electrolytes may greatly reduce the risk of thermal runaway. This provides the lithium battery with the level of safety that is required for their large-scale application in important and strategic markets.

Furthermore, compared with the conventional liquid electrolyte in the Comparative Example 1, the solid polymer electrolyte in the Examples 20-23 can possibly offer a perfect solution to solve the safety issues (particularly mitigating the Li dendrite growth always occurring in conventional liquid electrolytes) and improve the energy density owing to their potential advantages besides safety, ease of packaging, cost-effectiveness, excellent flexibility and containment, and lightweight. The leakage and flammability of electrolyte and the demerits of liquid electrolytes can be mitigated by using solid polymer electrolyte in electrochemical cells. Solid polymer electrolytes offer a perfect solution to these safety concerns and to the enhancement of energy density.

On another aspect, the ionic liquid electrolytes in all of the Examples exhibit acceptable stability toward lithium metal or graphite anode according to the electrochemical stability test data. The ionic liquid electrolytes have higher oxidation potentials (4.3 V) than that of the Comparative Examples (less than 4.2 V), thereby allowing the electrolyte to be a highly stable and safe electrolyte system for Li batteries in practical applications. Lithium (Li) metal is a promising anode material for high-energy-density storage systems because of its high specific capacity (3860 mAhg$^{-1}$) and low reduction potential (−3.04V) versus the standard hydrogen electrode. The electrolyte is highly stable with Li mental anode, thereby allowing the electrolyte to be a highly stable and safe electrolyte system for high-energy-density Li mental batteries (LMBs) in practical applications.

Moreover, different Li salts at different concentrations in different ionic liquids can be used to prepare such electrolyte. For example, the salt concentration in the electrolytes can vary from 0.5 M to 8M. In addition, by using ionic liquid with the lithium salts used in the electrolyte system, high solubility of desired salts may be enabled in cases where high concentration electrolyte systems are called for.

In summary, the introducing of ionic liquid and/or ionomers appeared to considerably improve various electrochemical performances. The ionic liquid electrolytes have high ion conduction, low melting point, and high flash point, as well as the ability to form stable SEI onto lithium and graphite anodes. These electrolytes have the advantages of high-temperature resistance and non-flammability. These electrolytes may help to achieve safe and long life lithium secondary batteries. The electrolytes in these examples exhibited better ionic conductivity than the comparative materials. In addition, the electrolytes in these examples have high flash point and are highly stable at high temperature, thereby making them good candidates for high temperature lithium batteries, as well as other applications. These properties may benefit the charging/discharging rate performances of lithium ion batteries.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the disclosure includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electrolyte, comprising:
    an ionic liquid;
    an electrolyte salt, wherein the electrolyte salt is dispersed in the ionic liquid, and the electrolyte salt is selected from alkali metal salt and/or alkaline earth metal salt; and
    a polymer obtained by curing or crosslinking one or more cross-linkable components selected from the group consisting of:

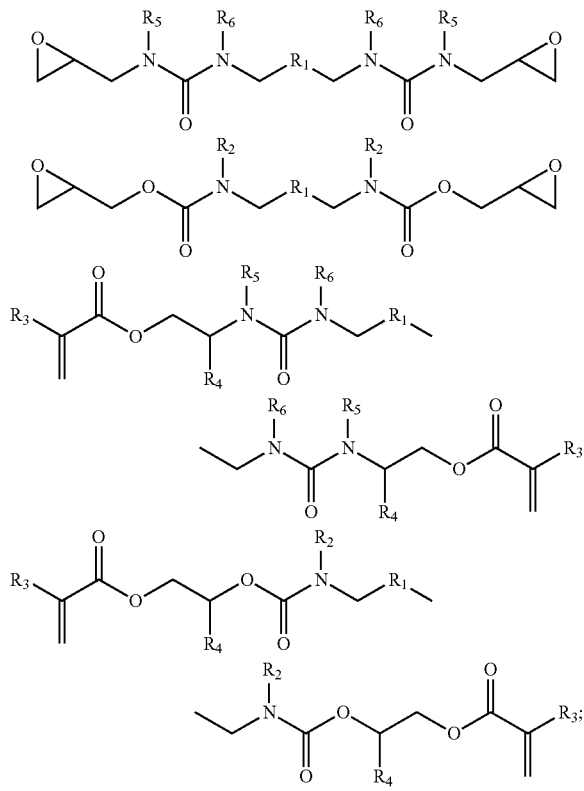

wherein $R_1$ is selected from the group consisting of:

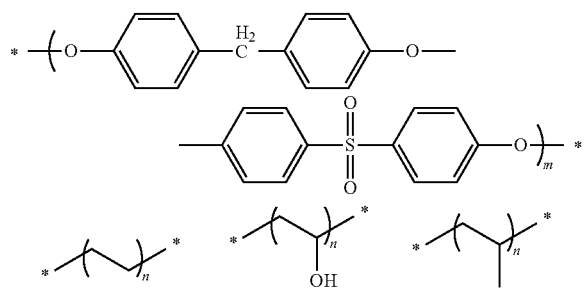

-continued

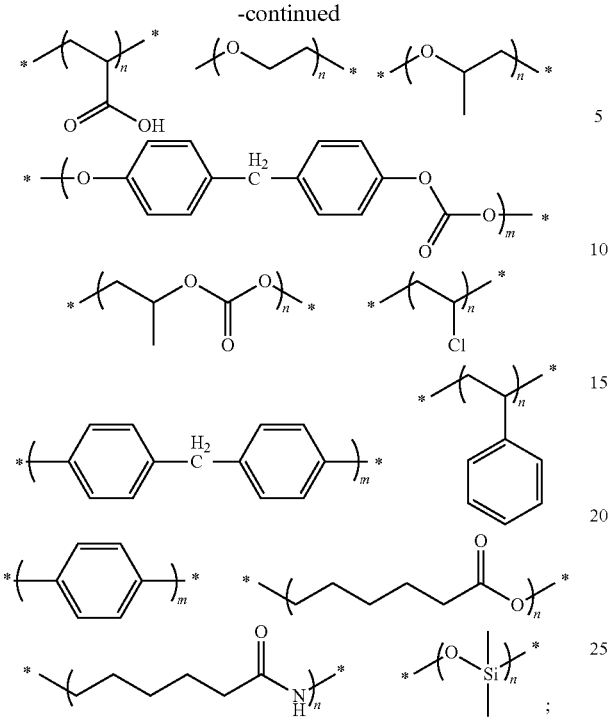

wherein n is an integer between 1 and 10,000, inclusively; m is an integer between 1 and 5,000, inclusively; $R_2$, $R_3$, $R_4$, $R_5$, and $R_6$ are each independently selected from the group consisting of:

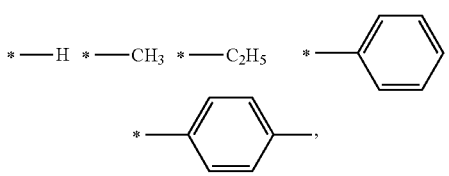

and
* indicates a point of attachment.

2. The electrolyte of claim 1, wherein the electrolyte salt comprises a lithium (Li) salt, a sodium (Na) salt, a potassium (K) salt, a calcium (Ca) salt, or a magnesium (Mg) salt, and the lithium salt is selected from the group consisting of lithium perchlorate ($LiClO_4$), lithium hexafluorophosphate ($LiPF_6$), lithiumborofluoride ($LiBF_4$), lithium hexafluoro-arsenide ($LiAsF_6$), lithium trifluoro-metasulfonate ($LiCF_3SO_3$), bis-trifluorom-ethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfo-nylimide (LiBETI), lithium bis(trifluoromethanesulphonyl) imide, lithium bis(fuorosulphonyl)imide, lithium trifluoromethanesulfonimide (LiTFSI), lithium bis(fluo-rosulfonyl)imide (LiFSI), lithium difluoro(oxalato)borate (LiDFOB), lithium perchlorate ($LiClO_4$), $LiC(CF_3SO_2)_3$, LiF, LiCl, LiBr, LiI, $Li_2SO_4$, $LiNO_3$, $Li_3PO_4$, $Li_2CO_3$, LiOH, lithium acetate, lithium trifluoromethyl acetate, lithium oxalate, and a combination thereof.

3. The electrolyte of claim 1, wherein a concentration of the electrolyte salt is between 0.5 M and 8 M.

4. The electrolyte of claim 1, further comprising an ionomer having a backbone group, an anionic substituent, and a cation.

5. The electrolyte of claim 4, wherein the ionomer is selected from the group consisting of:

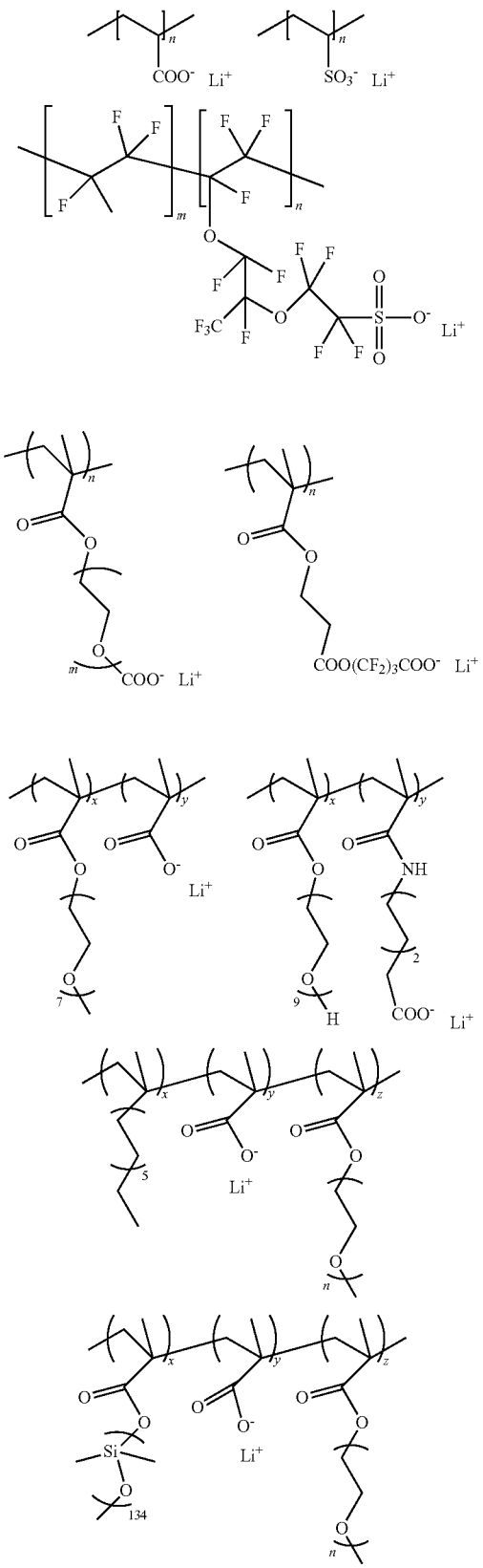

31
-continued
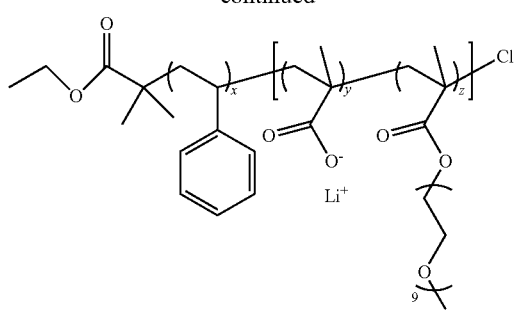
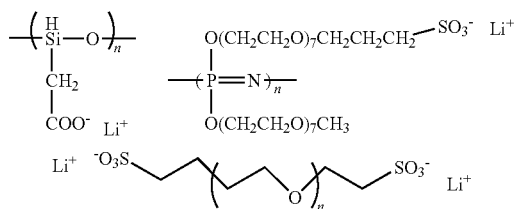
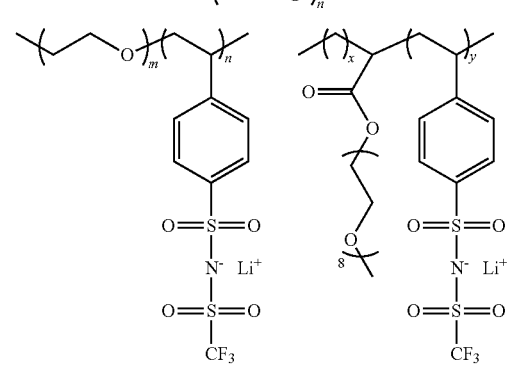
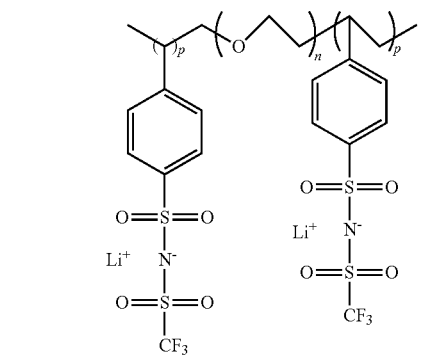
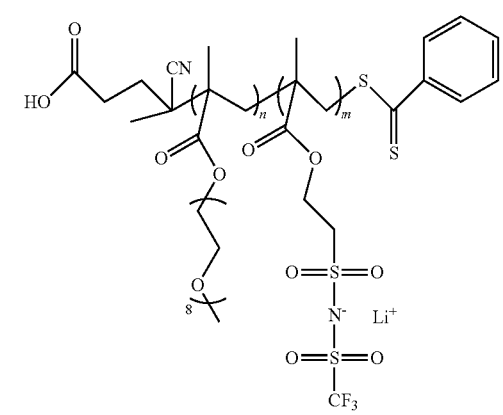
32
-continued
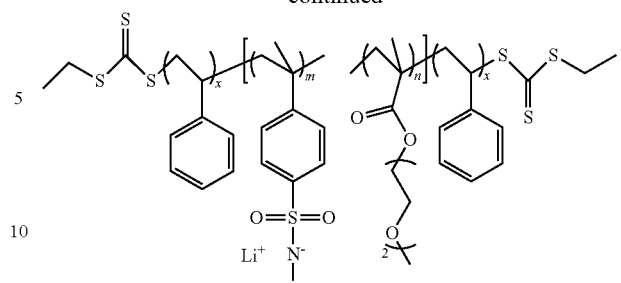
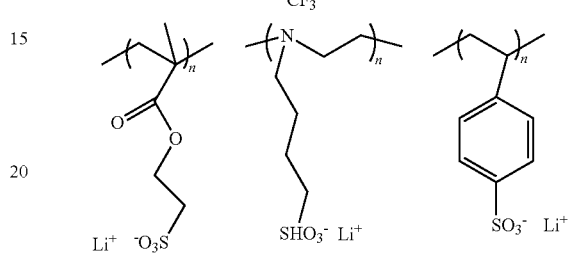
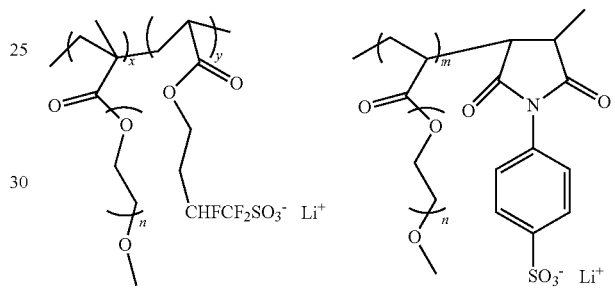
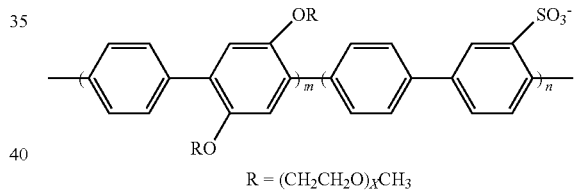
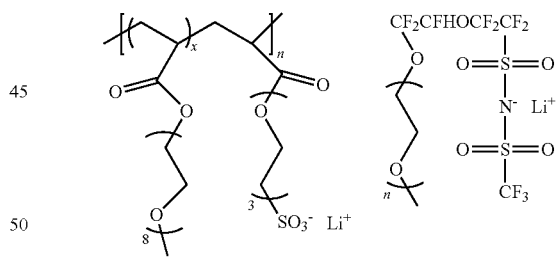
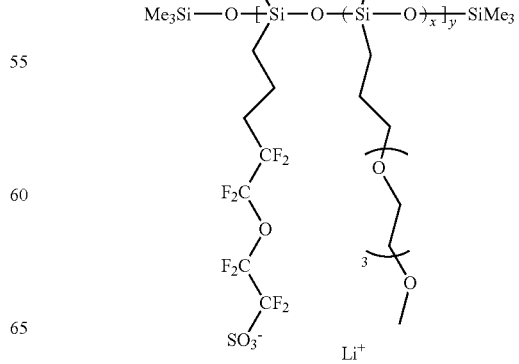

-continued
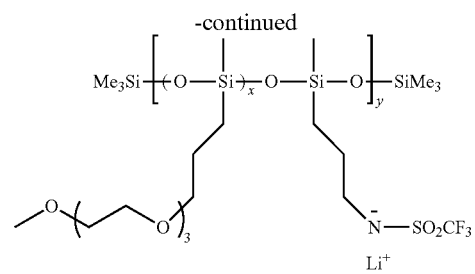
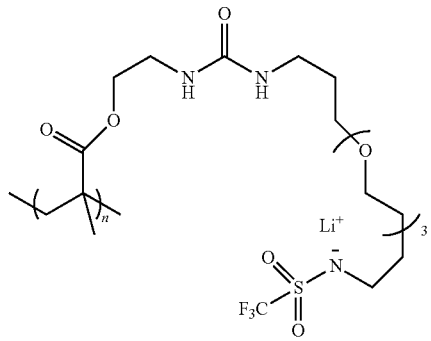
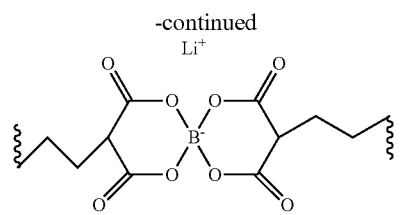
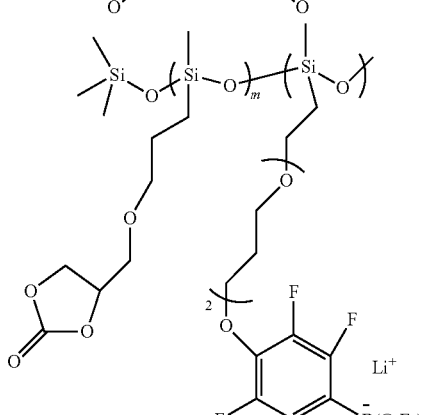
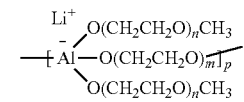
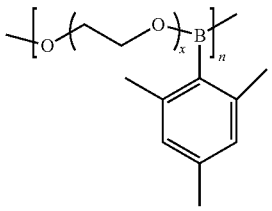

-continued

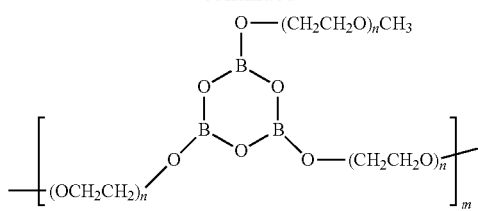

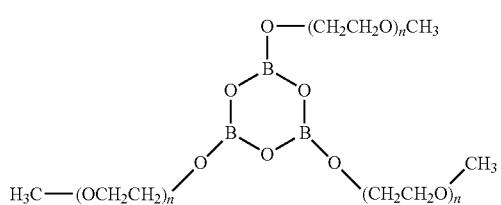

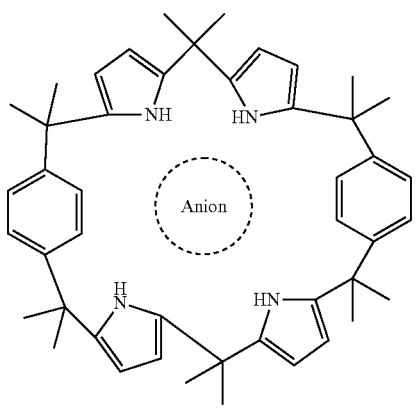

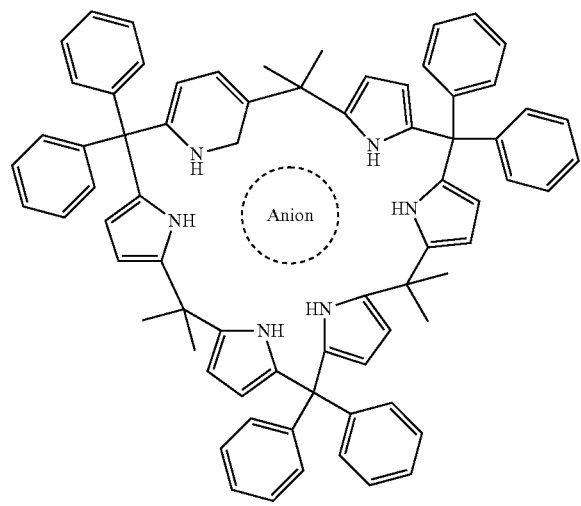

-continued

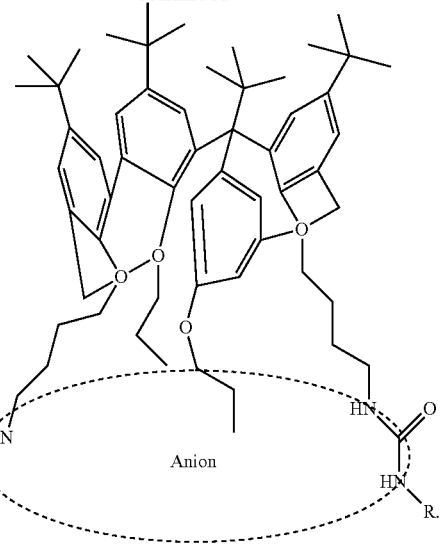

6. The electrolyte of claim 1, wherein the polymer has a concentration between 1 wt % and 40 wt % based on a total weight of the electrolyte.

7. The electrolyte of claim 1, further comprising a plasticizer.

8. The electrolyte of claim 1, wherein the one or more cross-linkable components are cured or crosslinked in the presence of an initiator or crosslinking agent, wherein the initiator or crosslinking agent comprises 2,2'-azobis(2-methylpropionitrile), ammonium persulfate, or azobisisobutyronitrile.

9. The electrolyte of claim 1, further comprising an additive selected from the group consisting of LiBOB, LiDFOB, fluoroethylene carbonate (FEC), vinylene carbonate (VC), Py13TFSI, Li[(FSO$_2$) (n-C$_4$F$_9$SO$_2$) N], 1,4-dioxane, bromide ionomers, methyl viologen, poly(ethyl α-cyanoacrylate), AlCl$_3$, H$_2$O, diglyme, triglyme, tetraglyme, diethyl ether, 1,3-dioxolane, tetrahydrofuran, 2,5-dimethyltetrahydrofuran, ethylene carbonate (EC), diethylene carbonate (DEC), 1,2-dimethoxyethane(DME), propylene carbonate, dimethyl carbonate, ethyl methyl carbonate, diethyl carbonate, vinyl ethylene carbonate, trimethyl phosphate, triethyl phosphate, triphenyl phosphate, tris(2,2,2-trifluoroethyl)phosphate, tris(2,2,2-trifluoroethyl) phosphite, dimethyl sulfone, ethyl methyl sulfone, sulfolane, sulfoxide, acetonitrile, propionitrile, butyronitrile, diphenyl sulfone, methyl phenyl sulfone, isopropyl sulfone, trimethylene sulfone, methyl difluoroacetate, difluoroethyl acetate, hexafluoroisopropyl triphosphate, triisopropyl ethylsulfonyl (pentafluorophenyl) phosphine, hydrofluoroether, 1,1,2,2-tetrafluoroethyl 2,2,3,3-tetrafluoropropyl ether, bis(2,2,2-trifluoroethyl) ether, oligo ethylene glycol methyl ether, tetraethylene glycol dimethyl ether, bis(2,2,2-trifluoroethyl) ether, oligoethylene glycol, 1,2-dimethoxyethane carbonate, fluoromethylene-ethylene carbonate, prop-1-ene-1,3-sultone, succinic anhydride, and a mixture thereof.

10. The electrolyte of claim 9, wherein a weight percentage of the additive is between 1 wt % and 20 wt % based on a total weight of the electrolyte.

11. An anode-free rechargeable battery comprising:
a current collector;
a cathode with an electroactive material, and
the electrolyte of claim 1.

12. The anode-free rechargeable battery of claim 11, further comprising a cathode current collector, wherein the cathode current collector comprises aluminum, nickel, titanium, stainless steel, or carbon paper.

13. The anode-free rechargeable battery of claim 11, wherein the electroactive material is selected from the group consisting of lithium nickel cobalt manganese oxide, lithium nickel cobalt aluminum oxide, lithium titanate, metallic lithium, lithium metal oxide, lithium manganese oxide, lithium cobalt oxide, and lithium iron phosphate.

14. A battery, comprising:
the electrolyte of claim 1;
an anode; and
a cathode with an electroactive material.

15. The battery according to claim 14, wherein the anode is lithium metal or graphite.

16. The battery according to claim 14, wherein the electroactive material is selected from the group consisting of lithium nickel cobalt manganese oxide, lithium nickel cobalt aluminum oxide, lithium titanate, metallic lithium, lithium metal oxide, lithium manganese oxide, lithium cobalt oxide and lithium iron phosphate.

17. The electrolyte of claim 1, wherein the electrolyte has an ionic conductivity of at least $0.7 \times 10^{-3}$ S/cm at room temperature.

* * * * *